(12) United States Patent
Kim et al.

(10) Patent No.: US 9,804,814 B2
(45) Date of Patent: Oct. 31, 2017

(54) ELECTRONIC DEVICE AND METHOD OF INTERCONNECTING THE SAME

(71) Applicant: Samsung Electronics Co., Ltd., Suwon-si, Gyeonggi-do (KR)

(72) Inventors: Moon-Soo Kim, Seoul (KR); Moo-Young Kim, Seoul (KR); Yo-Han Lee, Seongnam-si (KR); Jung-Eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 14/694,266

(22) Filed: Apr. 23, 2015

(65) Prior Publication Data

US 2015/0324163 A1    Nov. 12, 2015

(30) Foreign Application Priority Data

May 9, 2014    (KR) .................. 10-2014-0055440

(51) Int. Cl.
*G06F 3/14*     (2006.01)
*G09G 5/12*     (2006.01)

(52) U.S. Cl.
CPC .......... *G06F 3/1454* (2013.01); *G06F 3/1446* (2013.01); *G09G 5/12* (2013.01); *G09G 2300/0452* (2013.01); *G09G 2354/00* (2013.01); *G09G 2360/14* (2013.01); *G09G 2360/144* (2013.01); *G09G 2370/06* (2013.01); *G09G 2370/16* (2013.01); *G09G 2370/22* (2013.01)

(58) Field of Classification Search
CPC .. G09G 5/12; G09G 2360/14; G09G 2370/16; G06F 3/1454; G06F 3/1446
See application file for complete search history.

(56) References Cited

U.S. PATENT DOCUMENTS 9,645,782 B2 *   5/2017   Holland ................. G06F 3/0481
2010/0180297 A1 *   7/2010   Levine ..................... H04N 5/45
                                                                                     725/38

FOREIGN PATENT DOCUMENTS

KR     10-2012-0105340 A     9/2012
KR          10-1259449 B1     4/2013

* cited by examiner

*Primary Examiner* — Abbas Abdulselam
(74) *Attorney, Agent, or Firm* — Jefferson IP Law, LLP

(57) ABSTRACT

A method of operating a first electronic device is provided. The method includes determining whether at least one second electronic device is present on the first electronic device, displaying at least one image on a display of the first electronic device, identifying a first information input to at least one image sensor of the at least one second electronic device, comparing the identified first information with a parameter of the displayed image, determining a location of the at least one second electronic device based on the comparison result, and displaying a second information on the display based on the determined location.

20 Claims, 20 Drawing Sheets

ELECTRONIC DEVICE AND METHOD OF INTERCONNECTING THE SAME

CROSS-REFERENCE TO RELATED APPLICATION(S)

This application claims the benefit under 35 U.S.C. §119(a) of a Korean patent application filed on May 9, 2014 in the Korean Intellectual Property Office and assigned Serial number 10-2014-0055440, the entire disclosure of which is hereby incorporated by reference.

TECHNICAL FIELD

The present disclosure relates to an electronic device and a method of interconnecting the same. More particularly, the present disclosure relates to an electronic device for recognizing one or more second electronic devices located on a display in the electronic device and for effectively sharing a file when it is wirelessly connected to one or more second electronic devices.

BACKGROUND

Due to the development of information communication technologies and semiconductor technologies, various electronic devices have been developed as multimedia devices that provide various multimedia services. For example, an electronic device provides various multimedia services, such as a messenger service, a broadcasting service, a wireless Internet service, a camera service, a music reproduction service, and the like.

Currently, thanks to the advantages of wireless communications, such as excellent mobility and easy installation and extension thereof, use of short-range wireless communications has increased in electronic devices. Here, the short-range wireless communication refers to communication through which information can be exchanged between nearby electronic devices that are interconnected with each other, and includes wireless Local Area Network (LAN), Bluetooth, Near Field Communication (NFC), ZigBee, and Wi-Fi direct.

The short-range wireless communication may interconnect an electronic device located within a certain distance from another electronic device, but, for example, when one or more second electronic devices are located on an electronic device, the locations of the second electronic devices cannot be recognized regardless of whether the electronic device has information on the second electronic devices.

Therefore, a need exists for an electronic device for recognizing one or more second electronic devices located on a display in the electronic device, and a method of interconnecting the same.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for recognizing one or more second electronic devices located on a display in the electronic device, and a method of interconnecting the same.

Another aspect of the present disclosure is to provide an electronic device for effectively sharing a file when it is wirelessly connected to one or more second electronic devices, and a method of interconnecting the same.

Another aspect of the present disclosure is to provide an electronic device for informing the user of a location of one or more second electronic devices wirelessly connected to the electronic device, and a method of interconnecting the same.

In accordance with an aspect of the present disclosure, a method of a first electronic device is provided. The method includes determining whether at least one second electronic device is present on the first electronic device, displaying at least one image on a display of the first electronic device, identifying a first information input to at least one image sensor of the at least one second electronic device, comparing the identified first information with a parameter of the displayed at least one image, determining a location of the at least one second electronic device according to the comparison result and displaying a second information on the display according to the determined location.

In accordance with another aspect of the present disclosure, a first electronic device is provided. The first electronic device includes a display, a sensor functionally connected to the display and a processor configured to determine whether at least one second electronic device is present on the first electronic device through the sensor, to display at least one image on the display, to identify a first information input to at least one image sensor of the at least one second electronic device, to compare the identified first information with a parameter of the displayed at least one image, to determine a location of the at least one second electronic device according to the comparison result, and to display the at least one second information on the display according to the determined location.

According to the present disclosure, a user interface that may be intuitively interconnected with one or more second electronic devices on an electronic device by determining the locations of the second electronic devices can be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
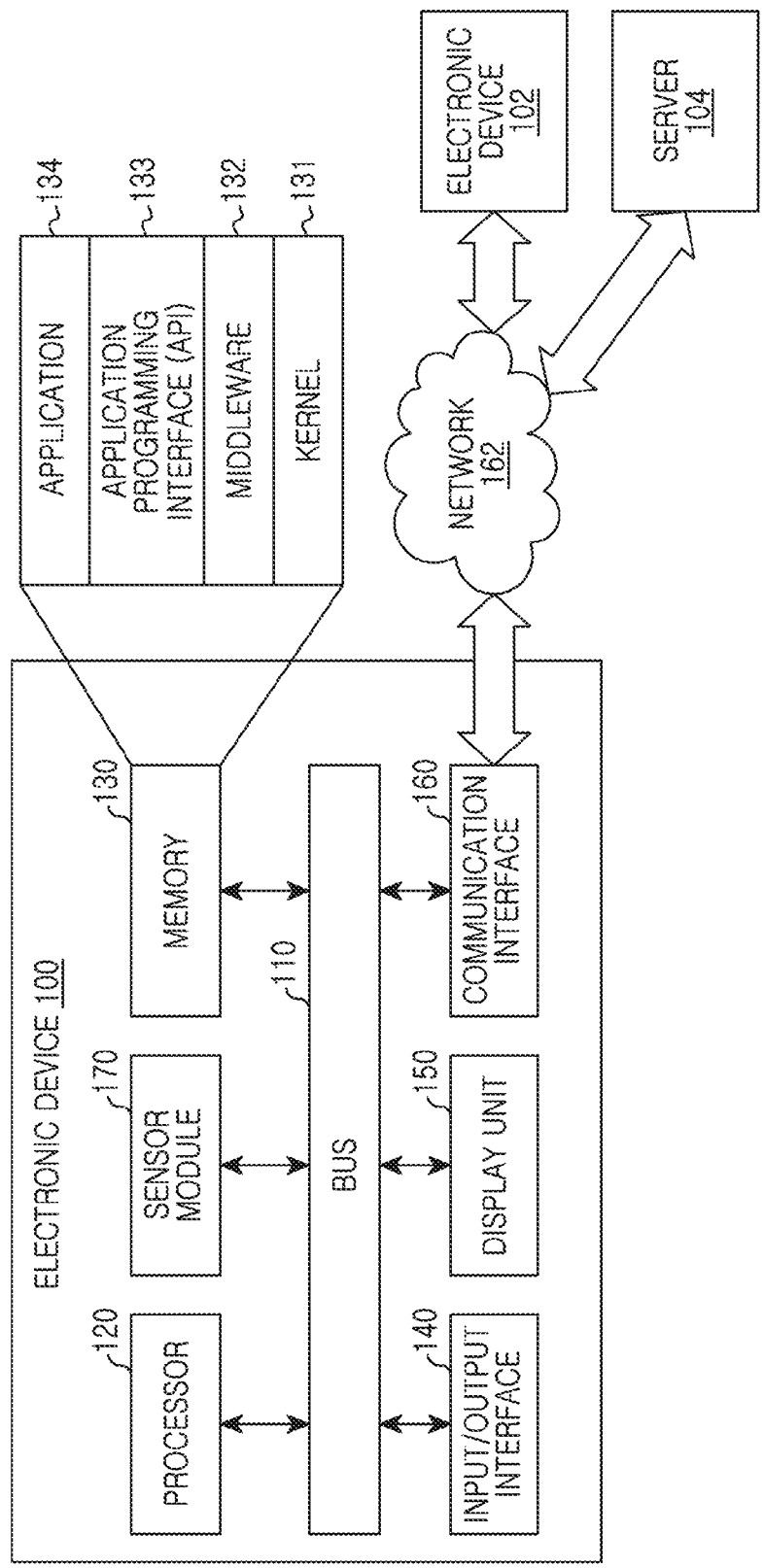
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include" or "may include" refers to the existence of a corresponding disclosed function, operation or component which can be used in various embodiments of the present disclosure and does not limit one or more additional functions, operations, or components. Further, as used in various embodiments of the present disclosure, the terms "include", "have" and their conjugates may be construed to denote a certain characteristic, number, operation, constituent element, component or a combination thereof, but may not be construed to exclude the existence of or a possibility of addition of one or more other characteristics, numbers, operations, constituent elements, components or combinations thereof.

The term "or" used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The above expressions may be used merely for the purpose of distinguishing one element from the other elements. For example, a first electronic device and a second electronic device indicate different electronic devices although both of them are electronic devices. For example, without departing from the scope of the present disclosure, a first component element may be named a second component element. Similarly, the second component element also may be named the first component element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG-1 or MPEG-2) Audio Layer 3 (MP3) player, a mobile medical device, a camera, a wearable device (for example, a Head-Mounted-Device (HMD), such as electronic glasses, electronic clothes, an electronic bracelet, an electronic necklace, an electronic appcessory, an electronic tattoo, a smart watch, and the like.

According to an embodiment of the present disclosure, an electronic device may be a smart home appliance with a communication function. The smart home appliance as an example of the electronic device may include at least one of, for example, a television, a Digital Versatile Disc (DVD) player, an audio system, a refrigerator, an air conditioner, a vacuum cleaner, an oven, a microwave oven, a washing machine, an air cleaner, a set-top box, a Television (TV) box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to an embodiment of the present disclosure, the electronic devices may include at least one of furniture or a part of a building/structure having a communication function, electronic boards, electronic signature receiving devices, projectors, or various measuring equipment (e.g., equipment for a water supply, an electricity, gases or radio waves).

An electronic device according to various embodiments of the present disclosure may be a combination of one or more of above described various devices. In addition, an electronic device according to various embodiments of the present disclosure is not limited to the above described devices.

Hereinafter, an electronic device according to various embodiments of the present disclosure will be described with reference to the accompanying drawings. In various embodiments of the present disclosure, the term "user" may indicate a person using an electronic device or a device (e.g., an artificial intelligence electronic device) using an electronic device.

FIG. 1 is a block diagram of an electronic device according to an embodiment of the present disclosure.

Referring to FIG. 1, an electronic device 100 may include a bus 110, a processor 120, a memory 130, an input/output interface 140, a display 150, a communication interface 160, and a sensor module 170.

The bus 110 may connect the elements (for example, the processor 120, the memory 130, the input/output interface 140, the display 150, the communication interface 160, and the sensor module 170) included in the electronic device 100, and may control communications between the elements.

The processor 120 may receive commands from the elements included in the electronic device 100 through the bus 110, decipher the received commands, and perform calculations or data processing according to the deciphered commands. The processor 120 may execute one or more programs stored in the memory 130 to make a control to provide services corresponding to the corresponding programs. According to an embodiment of the present disclosure, the processor 120 may make a control to determine whether at least one second electronic device is present on the electronic device 100, display at least one image on the display 150, identify a first information element input to at least one image sensor of the second electronic device, compare the identified first information element with a parameter of the displayed image, and display the at least one second element on the display 150 according to the determined location.

According to an embodiment of the present disclosure, the processor 120 may identify the at least one second electronic device positioned on the electronic device 100, using at least one image sensor included in the image sensor, the touch screen, or the display 150 functionally connected to the electronic device 100. According to an embodiment of the present disclosure, the processor 120 may determine a location of the at least one second electronic device on the electronic device 100 by receiving pattern information input through the image sensor included in the second electronic device from the second electronic device, using at least one pattern information element displayed on the display 150.

According to an embodiment of the present disclosure, the processor 120 may display at least one pattern information element on the display 150, and display at least one icon associated with the second electronic device wirelessly connected to the electronic device 100. For example, the processor 120 may display various pattern information elements having colors or brightness based on the coordinates of the display 150.

According to an embodiment of the present disclosure, the processor 120 may include at least one Application Processor (AP) or at least one Communication Processor (CP). Here, the AP and the CP may be included in the processor 120 or different Integrated Circuit (IC) packages. Further, the APs and the CPs may be included in one IC package.

According to an embodiment of the present disclosure, the AP may drive an operating system or an application program to control at least one hardware or software element connected to the AP, and process data including multimedia data and perform calculations. Here, the AP may be implemented by a System on Chip (SoC).

According to an embodiment of the present disclosure, the CP may execute at least a part of a multimedia controlling function. The CP may classify and authenticate terminals within a communication network using a Subscriber Identification Module (SIM) (for example, a SIM card). Then, the CP may provide the user with services, such as voice calls, video calls, text messages, packet data, and the like. In addition, the CP may control data transmission and reception of the communication unit 160.

According to an embodiment of the present disclosure, the AP or the CP may load a command or data received from at least one of a non-volatile memory and other elements connected to each of the AP and the CP in a volatile memory, and may process the loaded command or data. The AP or the CP may store data received from or generated by at least one of other elements in a non-volatile memory.

According to an embodiment of the present disclosure, the CP may manage a data link in communication between an electronic device including hardware and other electronic devices connected to the electronic device through a network and may perform a function of converting a communication protocol. Here, the CP may be implemented by the SoC.

The processor 120 may include one or more data processors, image processors, and Coder-Decoders (CODECs). Moreover, the electronic device 100 may separately configure a data processor, an image processor, and a codec. According to an embodiment of the present disclosure, the processor 120 may further include a Graphics Processing Unit (GPU) (not illustrated).

The memory 130 may store a command or data received from the elements (for example, the processor 120, the input/output interface 140, the display 150, the communication interface 160, and the sensor module 170) included in the electronic device 100, or generated by the at least one of the elements.

The memory 130 may store at least one program for a service of the electronic device 100. According to an embodiment of the present disclosure, the memory 130 may include a kernel 131, a middleware 132, an Application Programming Interface (API) 133, and an application 134. According to an embodiment of the present disclosure, each of the programs may include a programming module, and each programming module may include software, firmware, hardware, or a combination of two or more thereof.

According to an embodiment of the present disclosure, the kernel 131 may control or manage system resources (for example, the bus 110, the processor 120, and the memory 130), used for executing an operation or function implemented in the remaining programming modules (for example, the middle ware 132, the API 133, and the application 134). The kernel 131 may provide an interface that allows the middle ware 132, the API 133, or the application 134 to access an individual element of the electronic device 100 for control or management.

According to an embodiment of the present disclosure, the middleware 132 may serve as an intermediary such that the API 133 or the application 134 communicates with the kernel 131 to transmit/receive data. The middleware 132 may perform load balancing for operation requests received from at least one application using a method of assigning priorities for using system resources (for example, the bus 110, the processor 120, and the memory 130) of the electronic device 100 to the operation requests.

According to an embodiment of the present disclosure, the API 133 is an interface used by the application 134 to control a function provided from the kernel 131 or the middleware 132, and may include at least one interface or function (for example, an instruction) for a file control, a window control, image processing, or a character control.

According to an embodiment of the present disclosure, the application 134 may include a Short Message Service (SMS)/Multimedia Messaging Service (MMS) application, an email application, a calendar application, an alarm application, a health care application (for example, an application for measuring a quantity of exercise, blood sugar, and the like), and an environment information application (for example, an application for providing information on atmospheric pressure, humidity, or temperature). Additionally or alternatively, the application 134 may be an application associated with exchanging of information between the electronic device 100 and an external electronic device, for example, another electronic device 102. The application related to the information exchange may include, for example, a notification transmission application for transferring certain information to an external electronic device or a device management application for managing an external electronic device.

For example, the notification transmission application may include a function of transferring, to the external electronic device (for example, the other electronic device 102), notification information generated from other applications of the electronic device 100 (for example, an SMS/MMS application, an e-mail application, a health management application, and an environmental information application). Additionally or alternatively, the notification transmission application may, for example, receive notification information from an external electronic device (for example, the other electronic device 102) to provide the notification information to a user. The device management application may manage (for example, install, delete, or update), for example, a function of at least a part of an external electronic device (for example, the other electronic device 102) that communicates with the electronic device 100 (for example, turning on/off the external electronic device (or a few element) or adjusting brightness (or resolution) of a display), an application operated in the external electronic device, or a service provided from the external electronic device (for example, a call service or a message service).

In accordance with various embodiments of the present disclosure, the application 134 may include an application designated according to properties (for example, a type of the electronic device) of an external electronic device (for example, the other electronic device 102). For example, in a case where the external electronic device is an MP3 player, the application 134 may include an application related to the reproduction of music. Similarly, when the external electronic device is a mobile medical device, the application 134 may include an application related to health care. According to an embodiment of the present disclosure, the application 134 may include at least one of applications received from an application designated for the electronic device 100 or an application received from an external electronic device (for example, a server 104 or the other electronic device 102).

According to an embodiment of the present disclosure, the memory 130 may include an internal memory and an external memory. The internal memory may include at least one of a volatile memory (for example, a Dynamic Random Access Memory (DRAM), a Static RAM (SRAM), or a Synchronous DRAM (SDRAM)) and a non-volatile memory (for example, a One Time Programmable Read Only Memory (OTPROM), a PROM, an Erasable and Programmable ROM (EPROM), an Electrically Erasable and Programmable ROM (EEPROM), a mask ROM, a flash ROM, a NAND flash memory, or a NOR flash memory). According to an embodiment of the present disclosure, the internal memory may take the form of a Solid State Drive (SSD).

According to an embodiment of the present disclosure, the external memory may include at least one of a Compact Flash (CF), a Secure Digital (SD), a Micro-SD, a Mini-SD, an extreme Digital (xD) and a memory stick.

According to an embodiment of the present disclosure, the input/output interface 140 may transmit a command or data input from the user through an input/output device (for example, a sensor, a keyboard, or a touch screen) to the processor 120, the memory 130, the communication interface 160, or the sensor module 170 through, for example, the bus 110. For example, the input/output interface 140 may provide data associated with a touch of a user input through a touch screen to the processor 120. The input/output interface 140 may output, for example, a command or data received through the bus 110 from the processor 120, the memory 130, the communication interface 160, and the sensor module 170, to an input/output device (for example, a speaker or display). For example, the input/output interface 140 may output voice data processed by the processor 120 to the user through a speaker.

The display 150 may display various pieces of information (for example, multimedia data or text data) to the user.

According to an embodiment of the present disclosure, the communication interface 160 may connect communication between the electronic device 100 and an external electronic device (for example, the other electronic device 102 or the server 104). For example, the communication interface 160 may be connected to a network 162 through wireless communication or wired communication, and may communicate with an external device. The wireless communication may include at least one of, for example, Wi-Fi, Bluetooth (BT), Near Field Communication (NFC), GPS and cellular communication (for example, Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), and the like). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present disclosure, the network 162 may be a telecommunication network. The telecommunication network may include at least one of a computer network, Internet, Internet of things, and a telephone network. In accordance with an embodiment of the present disclosure, a protocol (for example, a transport layer protocol, a data link layer protocol, or a physical layer protocol) for the communication between the electronic device 100 and the external device may be supported by at least one of the application 134, the API 133, the middleware 132, the kernel 131, and the communication interface 160.

The sensor unit 170 may include at least one of, for example, a gesture sensor, a gyro sensor, an atmosphere sensor, a magnetic sensor, an acceleration sensor, a grip sensor, a proximity sensor, an image sensor, a living body sensor, a body conduction sensor, a temperature sensor, a humidity sensor, an illumination intensity sensor, and an ultraviolet (UV) sensor.

According to an embodiment of the present disclosure, the sensor module 170 may measure a physical quantity or detect an operation state of the electronic device 100, and may convert the measured or detected information to an electronic signal. For example, the sensor module may include an E-nose sensor, an electromyography (EMG) sensor, an electroencephalogram (EEG) sensor, an electrocardiogram (ECG) sensor, or a fingerprint sensor.

Names of the elements of the electronic device 100 according to various embodiments of the present disclosure may vary depending on a type of the electronic device 100. The electronic device 100 may include one or more of the above described elements, omit some of the elements, or may further include additional other elements according to the type of the electronic device 100.

The first electronic device according to various embodiments of the present disclosure includes a display, a sensor functionally connected to the display and a processor configured to determine whether at least one second electronic device is present on the first electronic device through the sensor and display at least one image on the display, to identify a first information element input to at least one image sensor of the second electronic device and compare the identified first information element with a parameter of the displayed image, and to determine a location of the second electronic device according to the comparison result and display the at least one second information element on the display according to the determined location.

According to various embodiments of the present disclosure, the sensor of the first electronic device may include an image sensor for recognizing a change in an image before and after the second electronic device is located in the first electronic device and output information of the second electronic device.

According to various embodiments of the present disclosure, the processor may be configured to display color information or brightness information input to the image sensor together with connection information for Bluetooth or Wi-Fi Direct connection.

According to various embodiments of the present disclosure, the processor may be configured to determine which part of the image displayed on the first electronic device the identified first information element corresponds to and to determine a location of the second electronic device.

Figure 2:
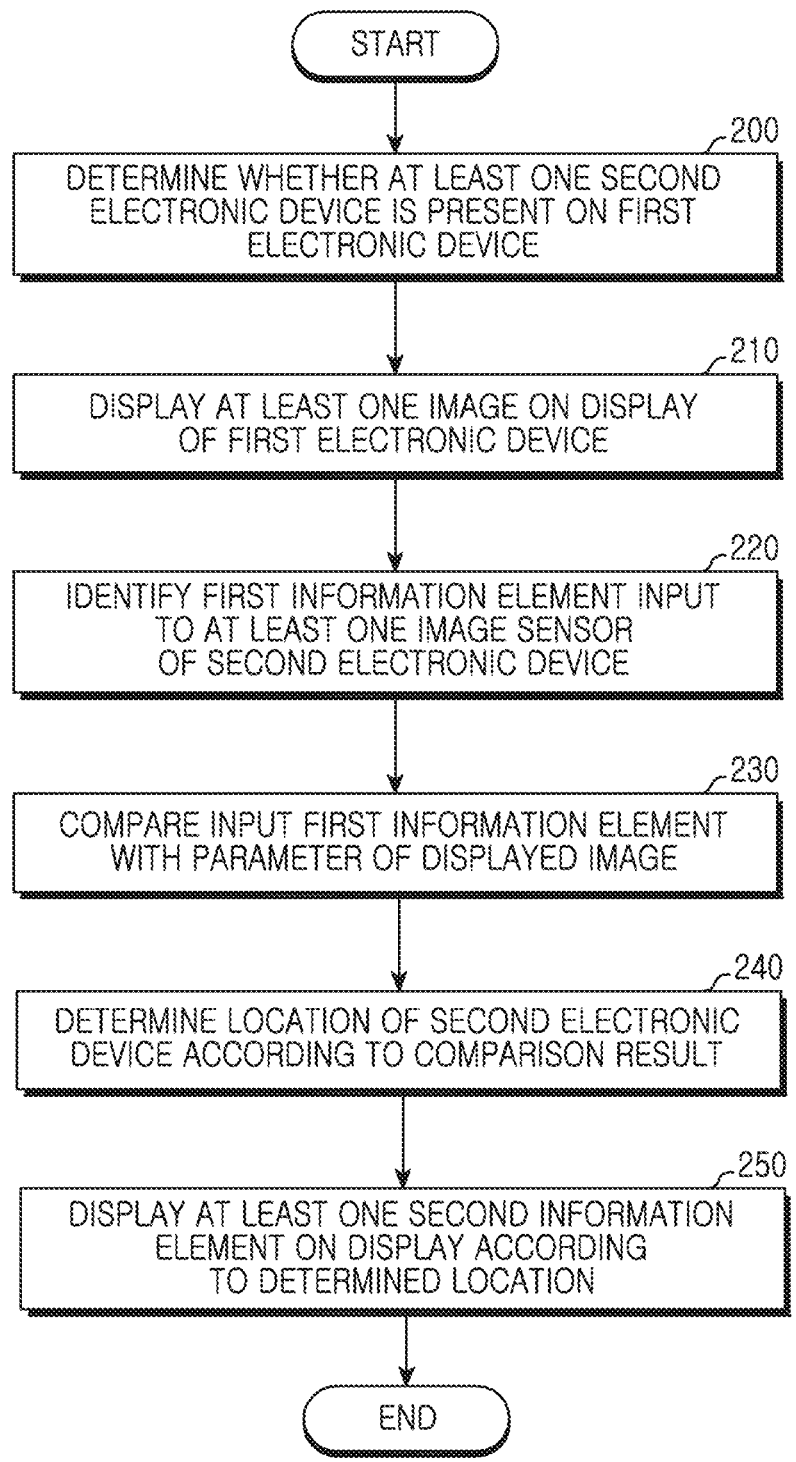
FIG. 2 illustrates a procedure for performing a function by a first electronic device while the first electronic device is interconnected with one or more second electronic devices according to an embodiment of the present disclosure.

FIG. 2 illustrates a procedure for performing a function by a first electronic device while the first electronic device is interconnected with one or more second electronic devices according to an embodiment of the present disclosure.

Referring to FIG. 2, the first electronic device may determine whether one or more second electronic devices are present on the first electronic device in operation 200.

Figure 6:
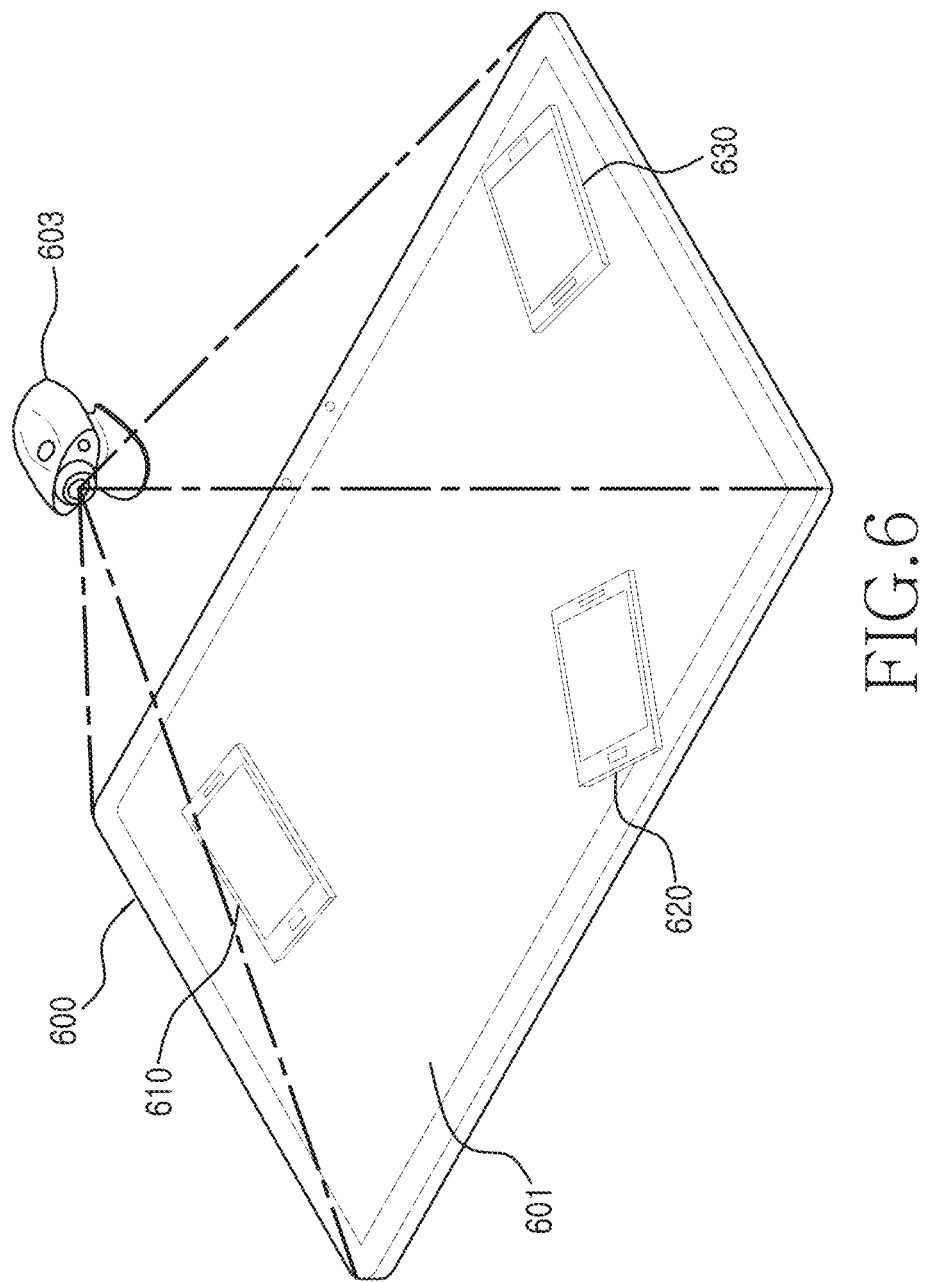
FIG. 6 illustrates a method of identifying one or more second electronic devices positioned on a first electronic device by the first electronic device according to an embodiment of the present disclosure.

FIG. 6 illustrates a method of identifying one or more second electronic devices positioned on a first electronic device by the first electronic device according to an embodiment of the present disclosure.

Referring to FIG. 6, the first electronic device may detect one or more second electronic devices 610, 620, and 630 positioned on a display 601 of a first electronic device 600 using an image sensor 603 functionally connected to the first electronic device 600.

According to an embodiment of the present disclosure, the image sensor 603 may determine whether another electronic device is positioned on the display 601 through a method of images before and after the one or more second electronic devices 610, 620, and 630 are located on the display 601 of the first electronic device 600.

According to an embodiment of the present disclosure, the image sensor 603 may determine whether another electronic device is positioned on the display 601 by identifying output values of service Light Emitting Diodes (LEDs), displays, Infrared Ray (IR) LEDs, and flash LEDs output from the second electronic devices 610, 620, and 630 positioned on the display 601. The image sensor 603 may be disposed at an upper end or a lower end of the first electronic device 600, and may be disposed at various locations where another electronic device on the display 601 may be detected.

Figure 7:
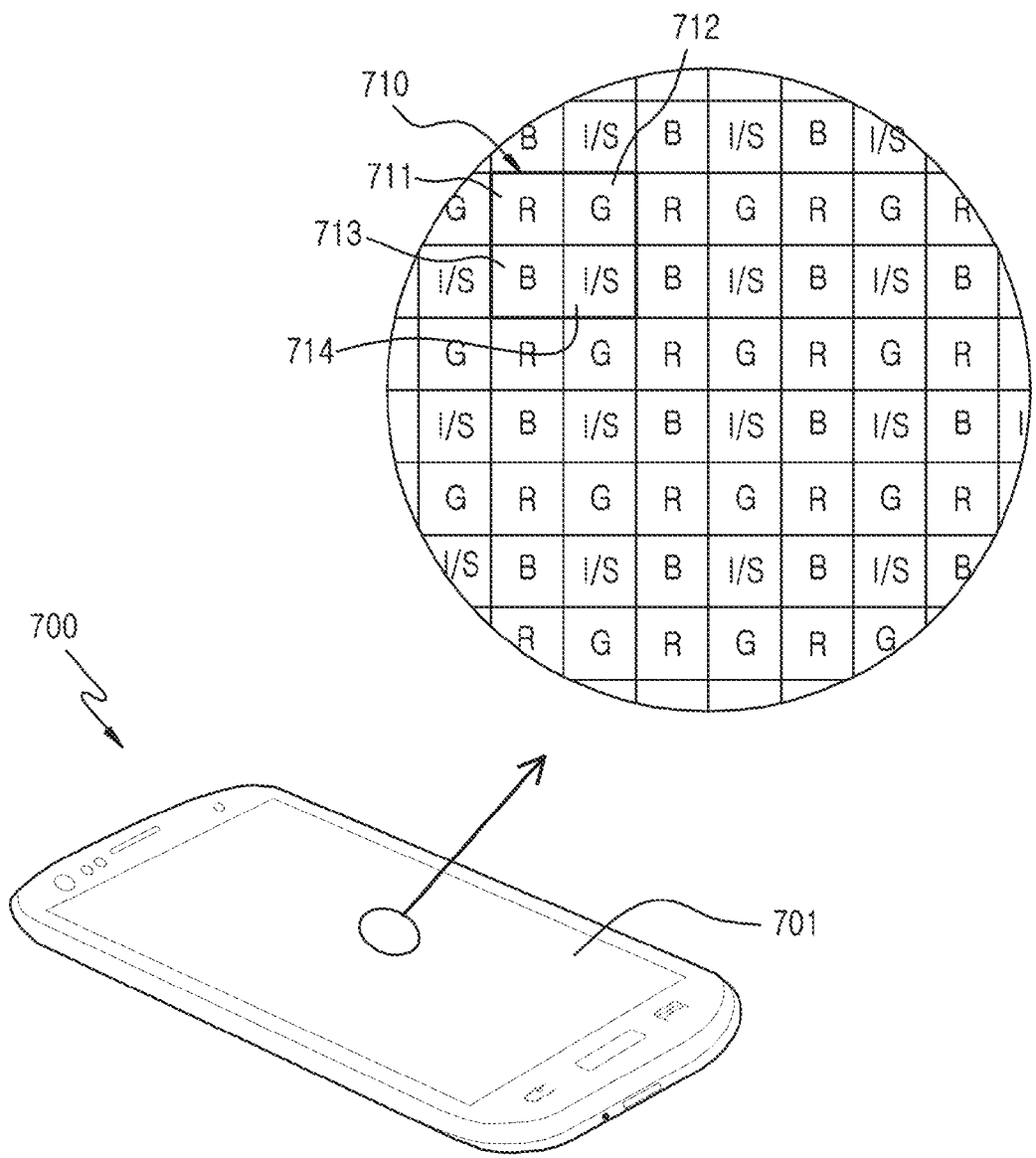
FIG. 7 illustrates a method of identifying one or more second electronic devices positioned on a first electronic device by the first electronic device according to an embodiment of the present disclosure.

FIG. 7 illustrates a method of identifying one or more second electronic devices positioned on a first electronic device by the first electronic device according to an embodiment of the present disclosure.

According to an embodiment of the present disclosure, the first electronic device may detect another electronic device through an image sensor that replaces at least one pixel of the pixels of the display.

Referring to FIG. 7, a display 701 of a first electronic device 700 may include a plurality of pixel arrays 710. The pixel array 710 may include a Red (R) pixel 711, a Green (G) pixel 712, and a Blue (B) pixel 713 that are light emitting pixels, and a light receiving pixel 714, such as an image sensor. The plurality of pixel arrays 710 may be disposed in the form of a grid, and the sizes of the pixels 711, 712, 713, and 714 included in the pixel arrays 710 may be various.

According to an embodiment of the present disclosure, the first electronic device 700 may detect another electronic device on the display 701 through at least one light receiving pixel 714 included in the display 701.

According to various embodiments of the present disclosure, the first electronic device may determine whether another electronic device is positioned on the display through a method of comparing electrostatic capacities using a touch screen panel without using an image sensor.

Figure 8:
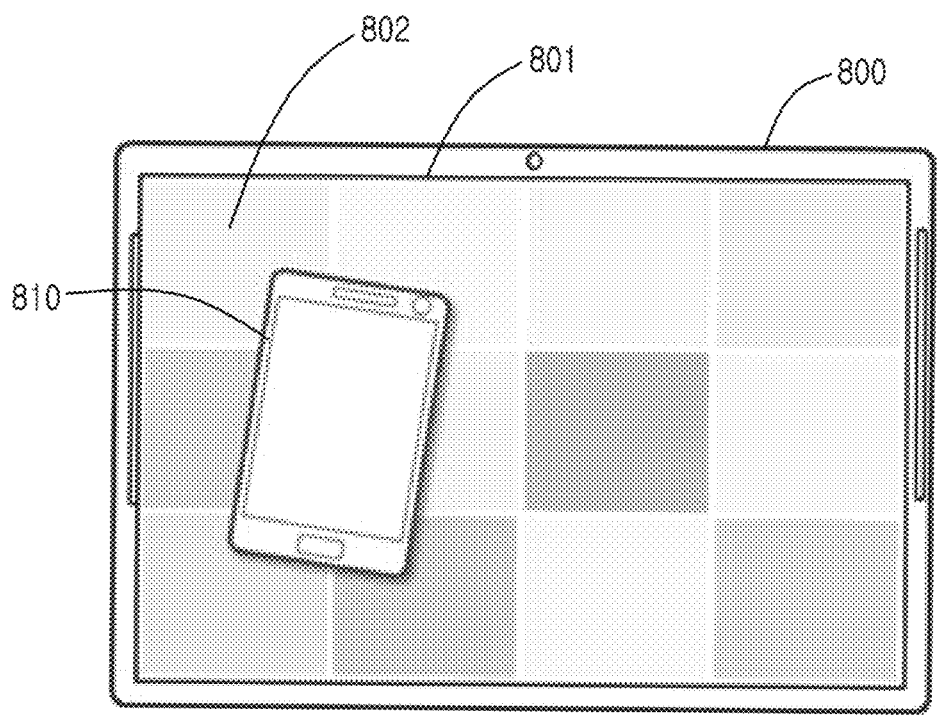
FIG. 8 illustrates a method of determining locations of one or more second electronic devices on a display in a first electronic device according to an embodiment of the present disclosure.

FIG. 8 illustrates a method of determining locations of one or more second electronic devices on a display in a first electronic device according to an embodiment of the present disclosure. The first electronic device may display at least one image on the display of the first electronic device in operation 210.

Referring to FIG. 8, at least one pattern information element 802 may be displayed on a display 801 of a first electronic device 800. The at least one pattern information element 802 may include different brightness or colors associated with the coordinates on the display 801 for determining a location of a second electronic device 810.

FIGS. 9A, 9B, 9C, and 9D illustrate a method of determining locations of one or more second electronic devices on a display in a first electronic device according to various embodiments of the present disclosure. The first electronic device may identify a first information element input to the at least one image sensor of the second electronic device in operation 220. The first electronic device may be wirelessly connected to the second electronic device.

Figure 9A:
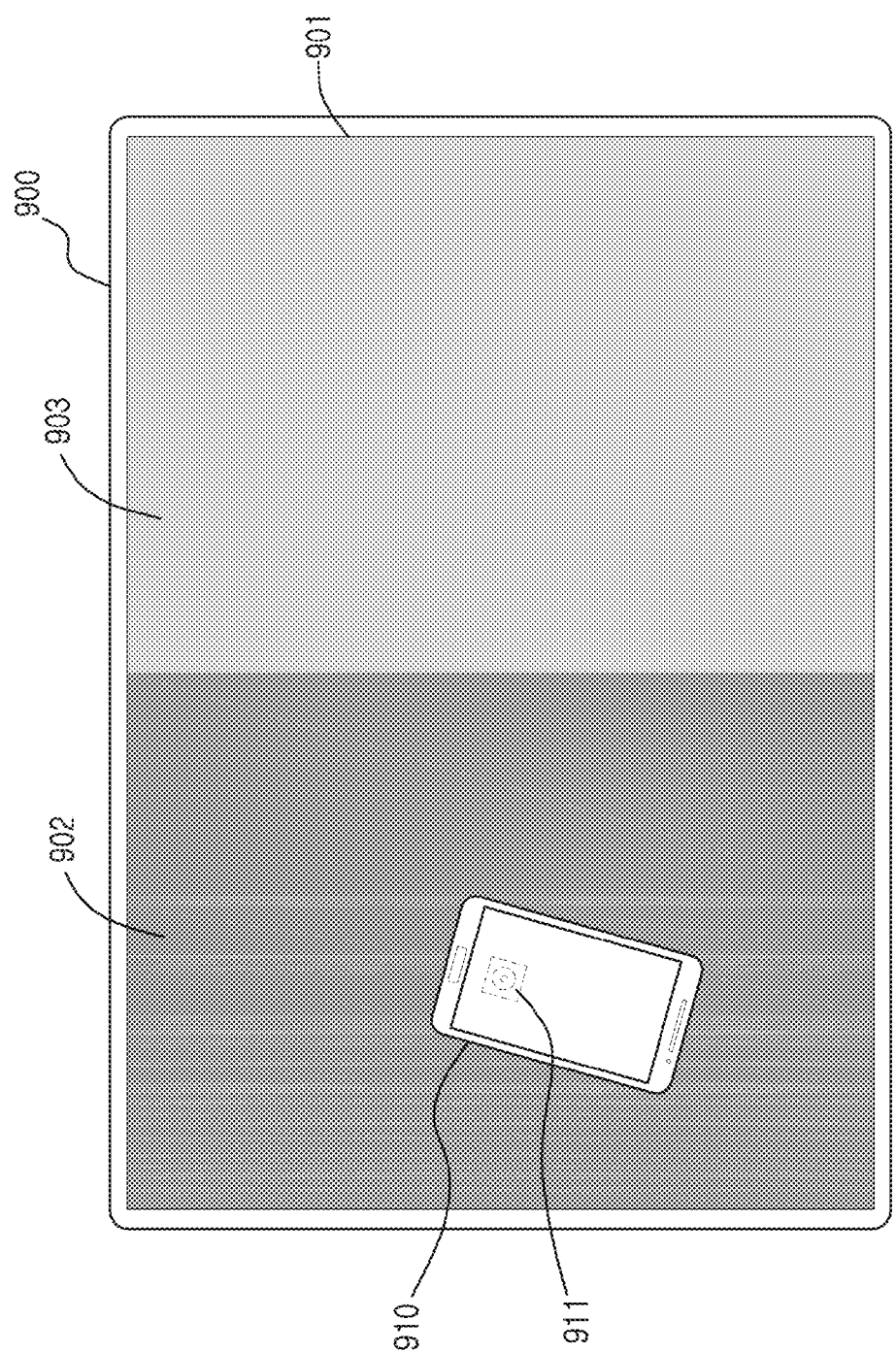
FIGS. 9A, 9B, 9C, and 9D illustrate a method of determining locations of one or more second electronic devices on a display in a first electronic device according to various embodiments of the present disclosure.

Referring to FIG. 9A, different pattern information elements 902 and 903 may be displayed on a display 901 of a first electronic device 900. A second electronic device 910 may receive a pattern information element 902 displayed at a location of the second electronic device 910 through an image sensor 911 provided on a front surface or a rear surface of the second electronic device 910.

According to an embodiment of the present disclosure, the second electronic device 910 may transmit the input pattern information element 902 to the electronic device 900.

The first electronic device may compare the identified first information element with the displayed image parameter in operation 230. For example, the parameter may include at least one of color information and brightness information.

According to an embodiment of the present disclosure, the first electronic device may compare a parameter with terminal information of the second electronic device when the first electronic device and the second electronic device are connected to each other.

According to an embodiment of the present disclosure, the first electronic device may compare a parameter with terminal information of the second electronic device by identifying wireless connection information of the first electronic device and the one or more second electronic devices located within a certain distance from the first electronic device when the first electronic device is not connected to the second electronic device.

The first electronic device may determine the locations of the second electronic devices according to the comparison result in operation 240. According to an embodiment of the present disclosure, the first electronic device may determine to which portion of the image displayed in the first electronic device the identified first information element corresponds. For example, as illustrated in FIG. 9A, when the first electronic device 900 receives a pattern information element 902 input from the second electronic device 910 through the image sensor 911 of the second electronic device 910, the first electronic device 900 may determine that the second electronic device 910 is located in an area corresponding to the provided pattern information element 902.

Figure 9B:
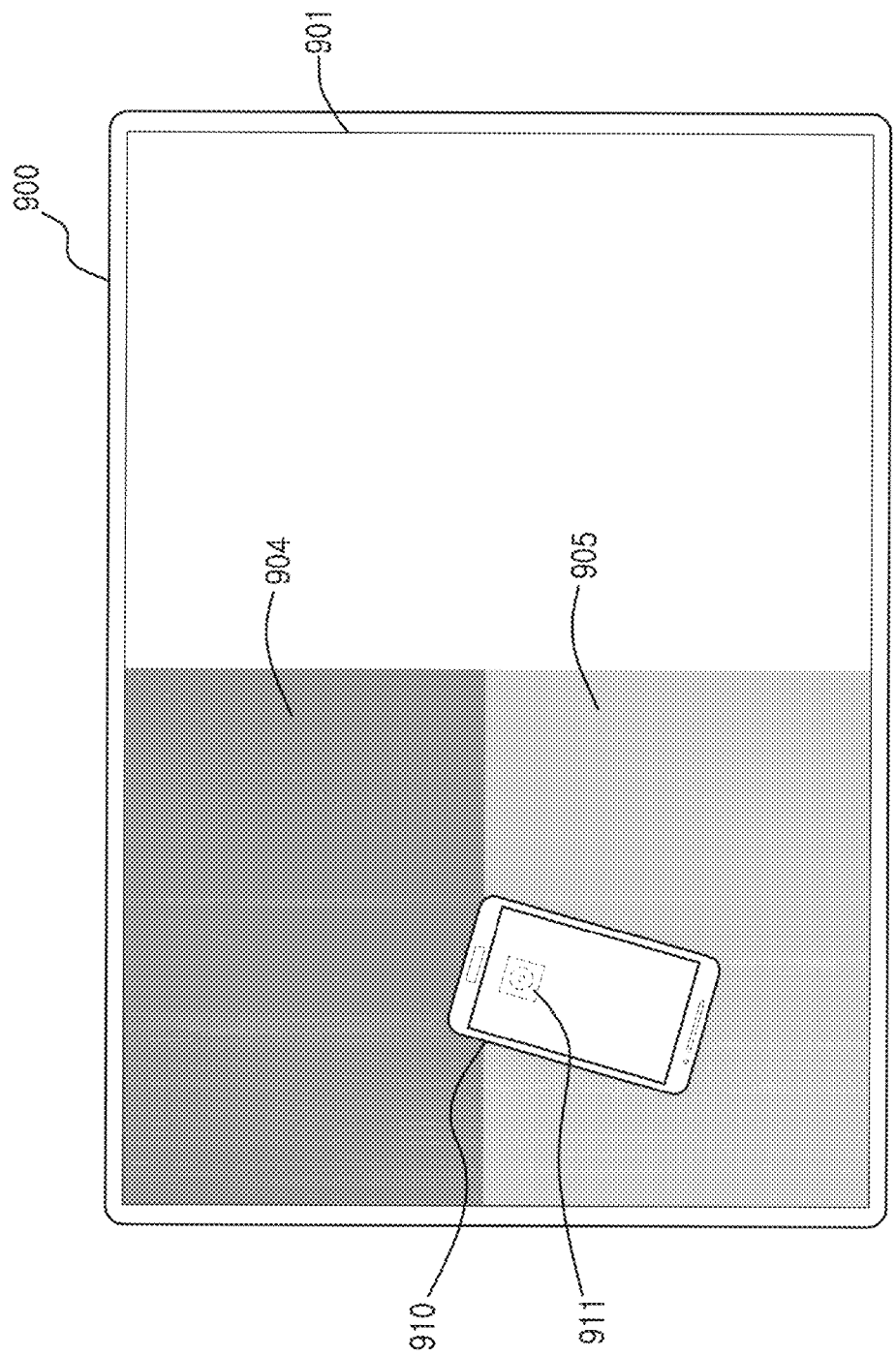

Referring to FIG. 9B, the first electronic device may further display different pattern information elements 904 and 905 in an area where it is determined that the second electronic device 910 is located. For example, the second electronic device 910 may receive a pattern information element 905 displayed at a location of the second electronic device 910 through the image sensor 911 provided on a front surface or a rear surface of the second electronic device 910.

According to an embodiment of the present disclosure, the second electronic device 910 may transmit the input pattern information element 905 to the first electronic device 900. The at least one pattern information element 905 may include different brightness or colors associated with the coordinates on the display 901 for determining a location of the second electronic device 910.

Figure 9C:
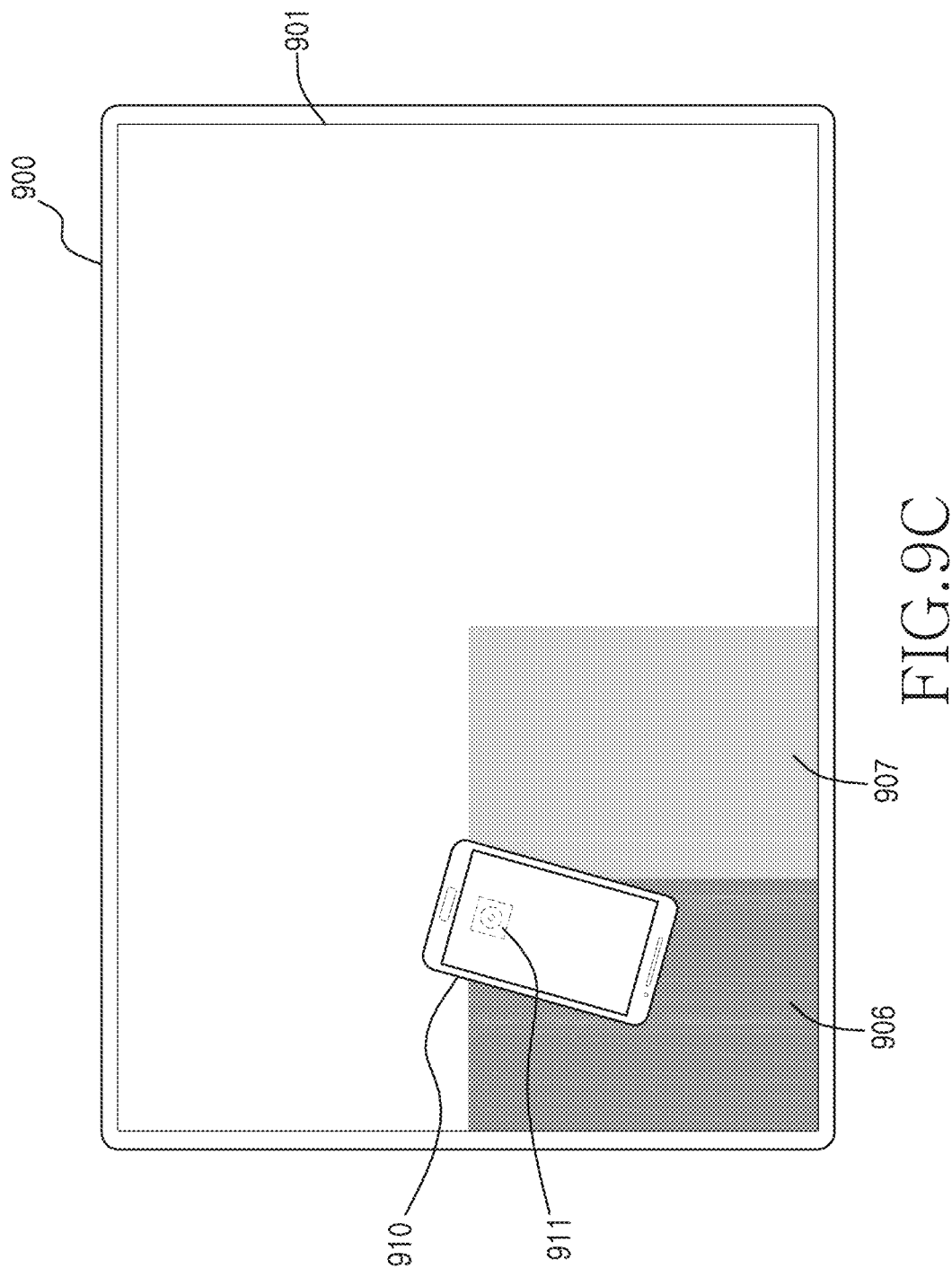
Figure 9D:
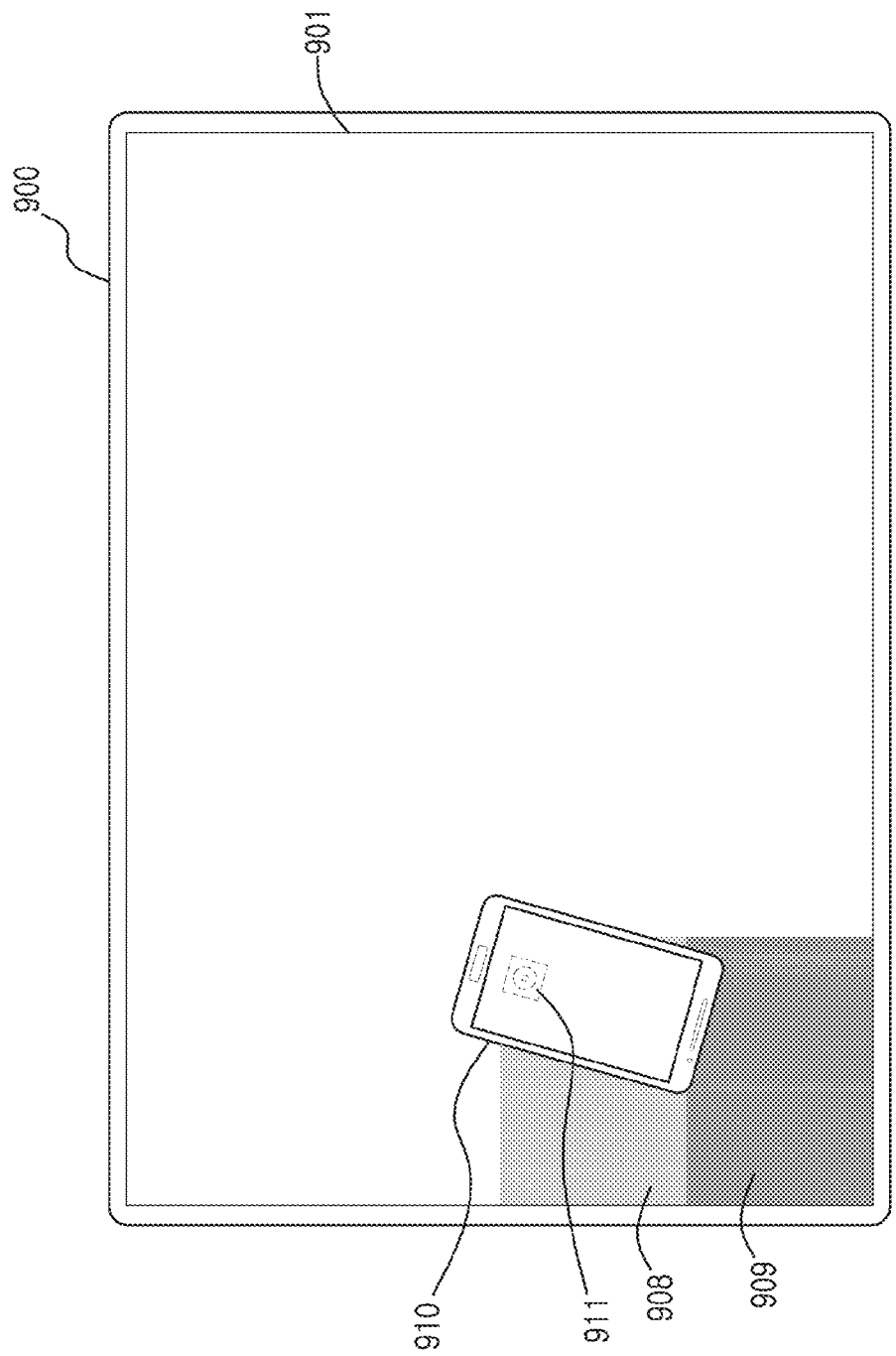

Referring to FIGS. 9C and 9D, the first electronic device may further display different pattern information elements 906, 907, 908, and 909 in the above-mentioned method. Accordingly, the first electronic device may determine the locations of the one or more second electronic devices on the display through the pattern information elements.

Figure 10A:
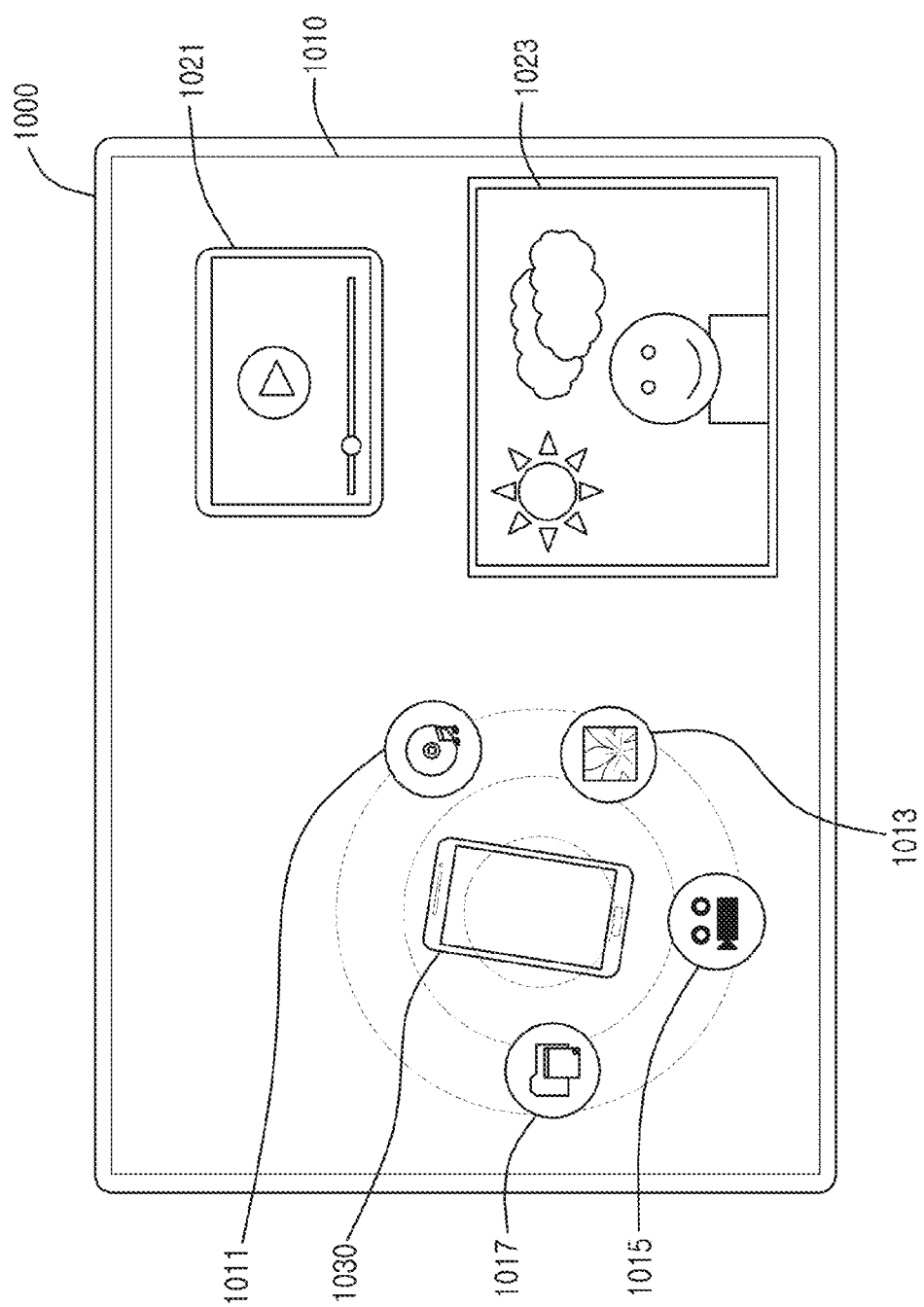
FIGS. 10A and 10B illustrate a method of performing a function by a first electronic device while the first electronic device is interconnected with one or more second electronic devices according to various embodiments of the present disclosure.
Figure 10B:
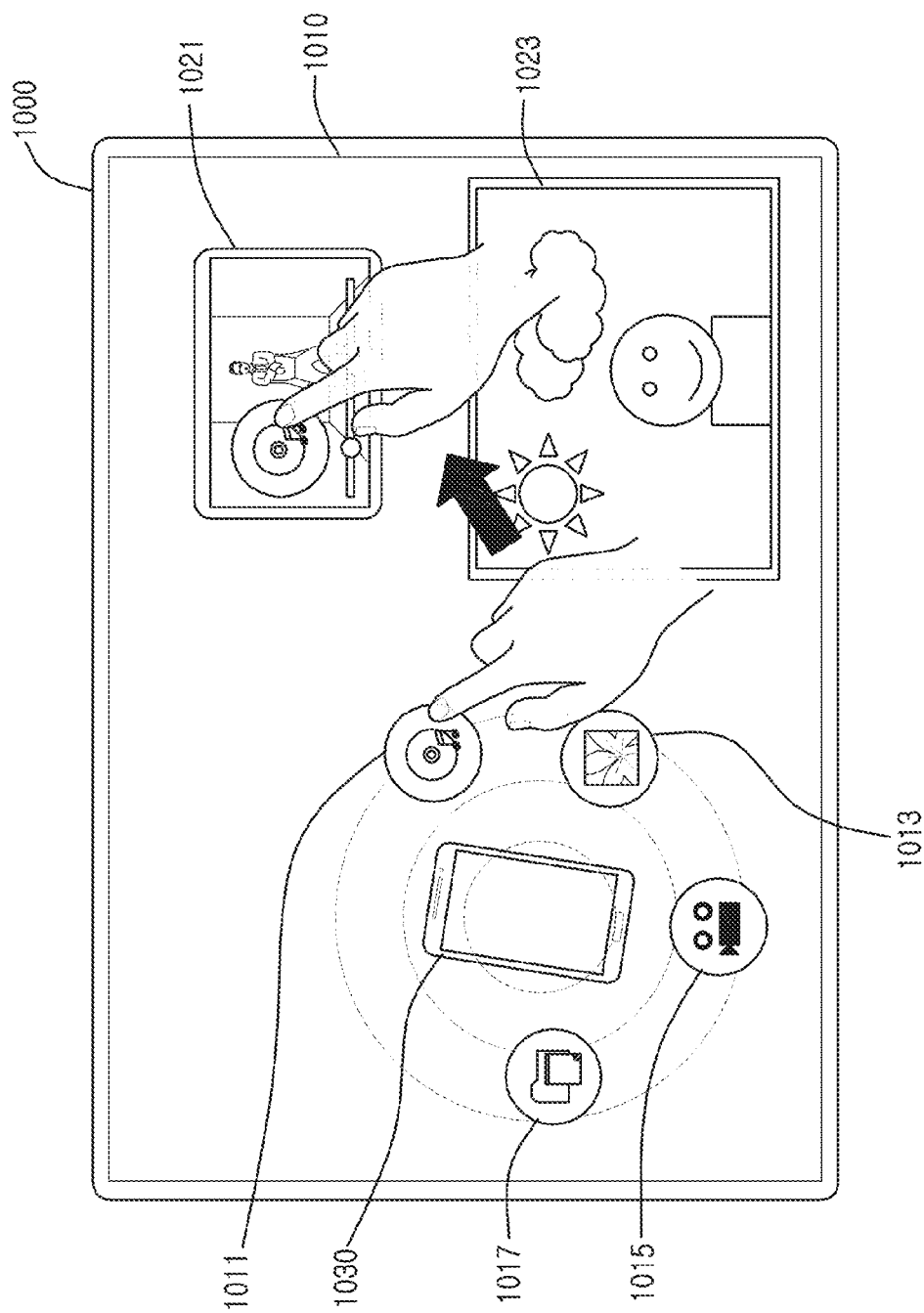

FIGS. 10A and 10B illustrate a method of performing a function by a first electronic device while the first electronic device is interconnected with one or more second electronic devices according to various embodiments of the present disclosure. The first electronic device may display at least one second information element on the display according to the determined location in operation 250.

Referring to FIG. 10A, the first electronic device may display one or more objects 1011, 1013, 1015, and 1017 including at least one of music, a video, a document, an image, an icon, and an application stored in a second electronic device 1030 in a peripheral area of the second electronic device 1030. Various contents may be reproduced or one or more executable function window 1021 and 1023 may be displayed on the display of a first electronic device 1000.

According to an embodiment of the present disclosure, the objects 1011, 1013, 1015, and 1017 displayed on the first electronic device 1000 may be dragged to the function window on a display 1010.

Referring to FIG. 10B, one object 1011 of the displayed one or more objects 1011, 1013, 1015 and 1017 may be selected and be dragged to the function window 1021.

According to an embodiment of the present disclosure, the first electronic device 1000 may perform a function associated with the dragged object 1011 through the function window 1021. For example, when the dragged object 1011 is a media file, the media file may be reproduced by the function window 1021.

According to various embodiments of the present disclosure, when the object 1013 including an image file is dragged to the function window 1023 that may display an image, the image file may be displayed in the image display function window 1023.

According to various embodiments of the present disclosure, in the above-mentioned method, various contents stored in the second electronic device may be reproduced or executed in the function window on the display or one or more contents may be executed at the same time.

Although it has been described in the various embodiments of the present disclosure, one or more objects for one second electronic device are displayed on the display and functions associated with the corresponding objects may be performed through the function window, the present disclosure is not limited thereto.

Figure 11:
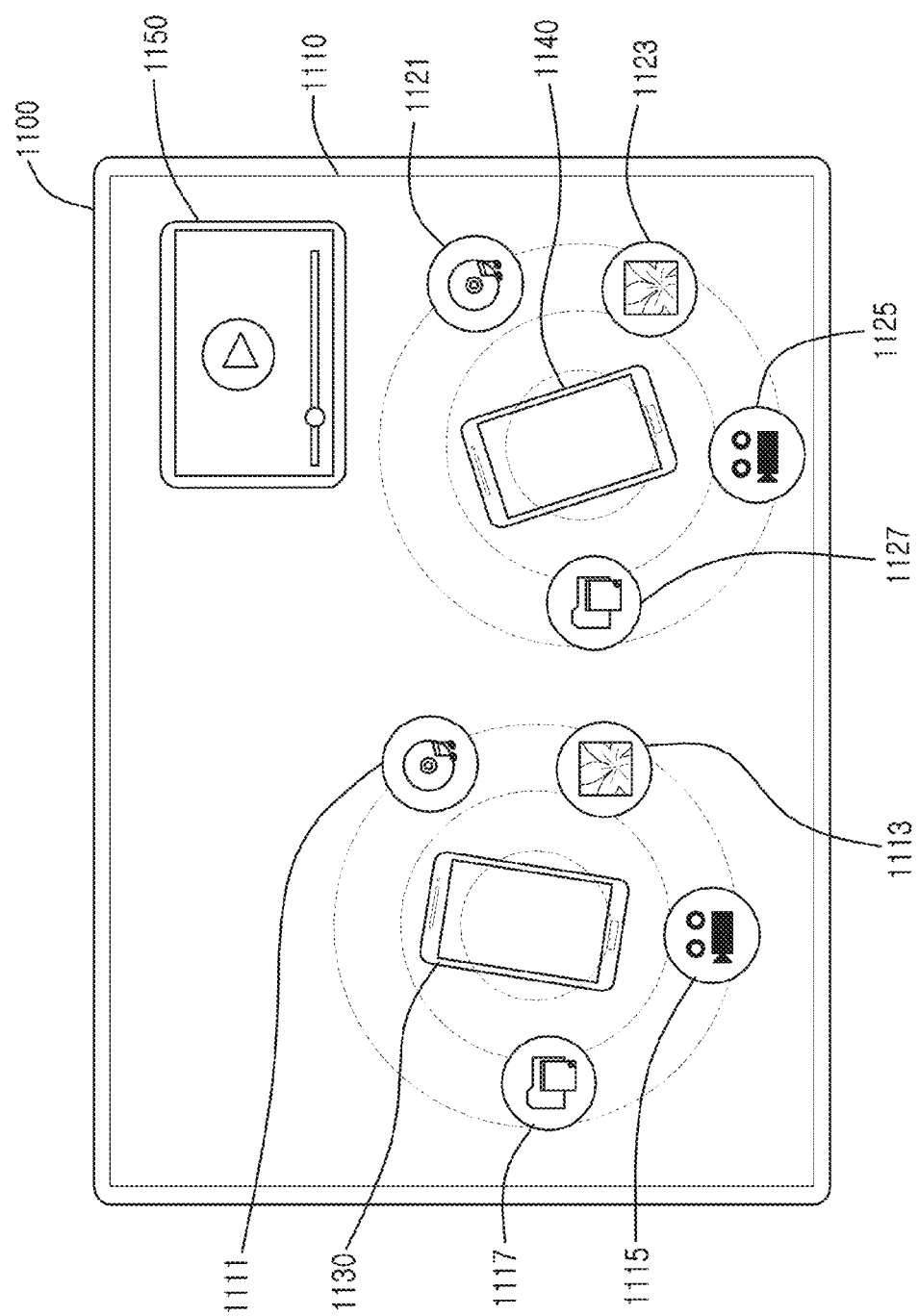
FIG. 11 illustrates a method for performing a function by a first electronic device while the first electronic device is interconnected with one or more second electronic devices according to an embodiment of the present disclosure.

FIG. 11 illustrates a method for performing a function by a first electronic device while the first electronic device is interconnected with one or more second electronic devices according to an embodiment of the present disclosure.

Referring to FIG. 11, one or more second electronic devices 1130 and 1140 may be located on a display 1110 of a first electronic device 1100, and one or more objects 1111, 1113, 1115, 1117, 1121, 1123, 1125, and 1127 for the one or more second electronic devices 1130 and 1140 may be displayed. The above-mentioned objects 1111, 1113, 1115, 1117, 1121, 1123, 1125, and 1127 may be executed through a function window 1150 displayed on the display 1110.

Figure 3:
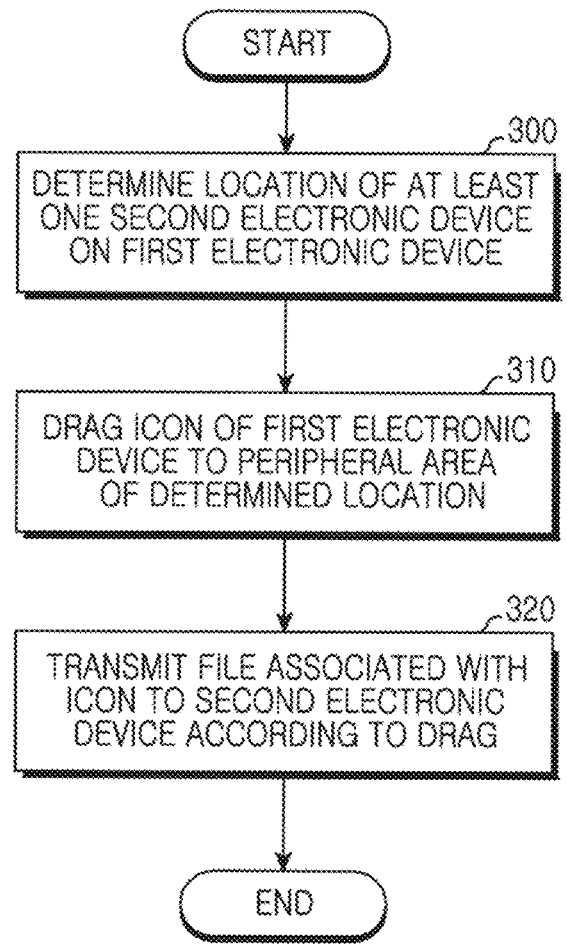
FIG. 3 illustrates a procedure for performing a function by a first electronic device while the first electronic device is interconnected with one or more second electronic devices according to an embodiment of the present disclosure.

FIG. 3 illustrates a procedure for performing a function by a first electronic device while the first electronic device is interconnected with one or more second electronic devices according to an embodiment of the present disclosure.

Referring to FIG. 3, the first electronic device may determine locations of one or more second electronic devices on the first electronic device in operation 300. For example, the first electronic device may determine whether one or more second electronic devices are positioned on the first electronic device, using one or more image sensors included an image sensor, a touchscreen, or a display functionally connected to the first electronic device.

Figure 12A:
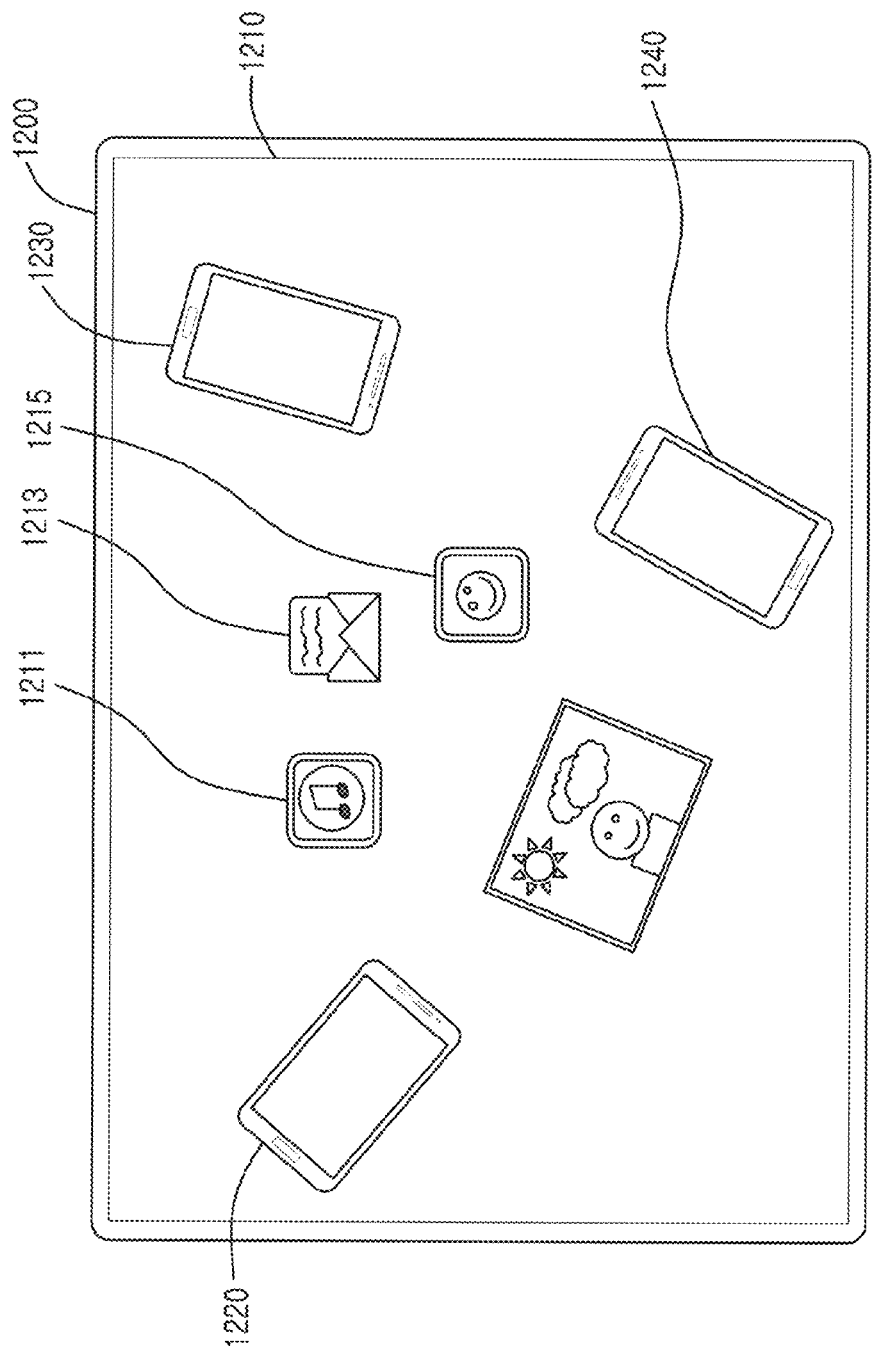
FIGS. 12A and 12B illustrate a method of performing a function by a first electronic device while the first electronic device is interconnected with one or more second electronic devices according to various embodiments of the present disclosure.
Figure 12B:
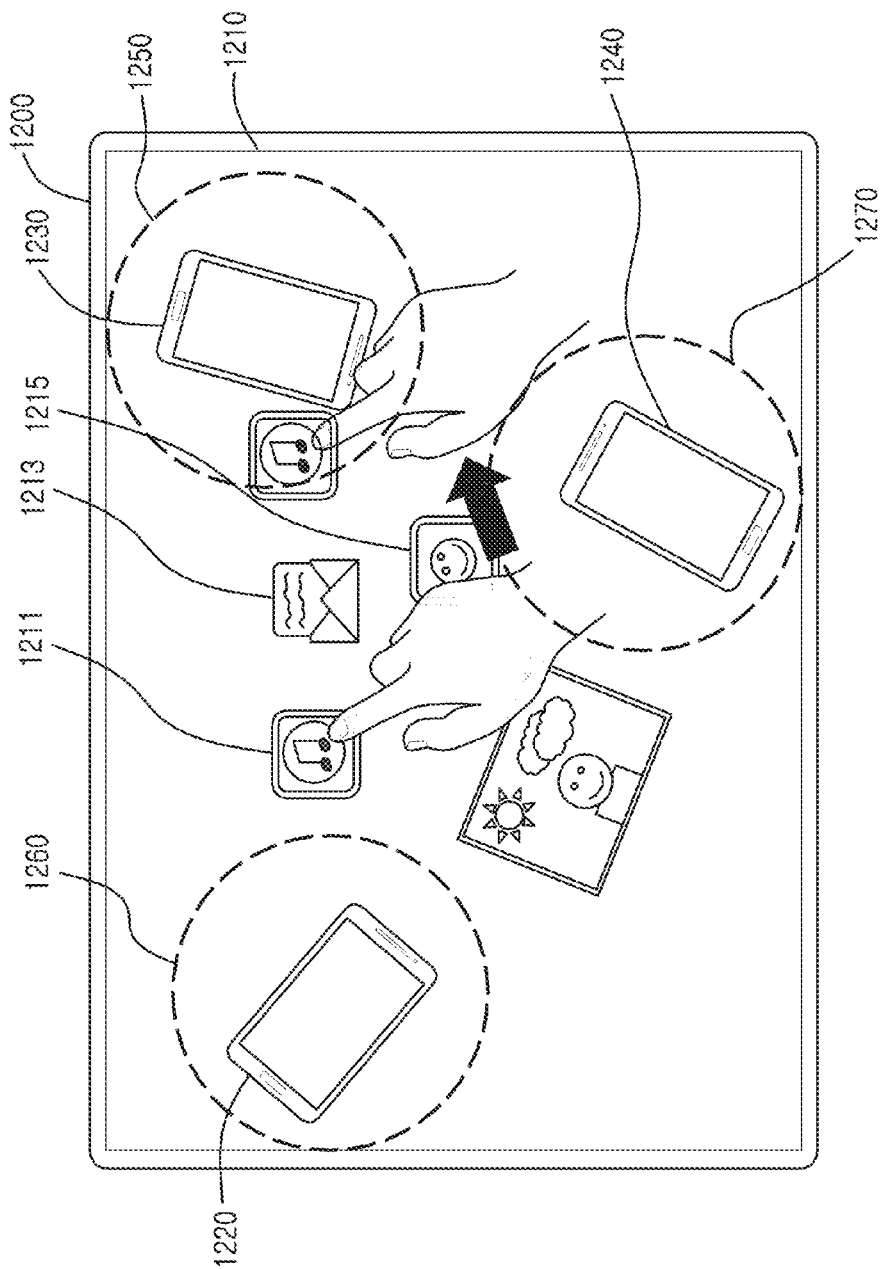

FIGS. 12A and 12B illustrate a method of performing a function by a first electronic device while the first electronic device is interconnected with one or more second electronic devices according to various embodiments of the present disclosure.

According to an embodiment of the present disclosure, the first electronic device may determine locations of the one or more second electronic devices on the first electronic device by displaying at least one pattern information element on the display and receiving pattern information elements input through the image sensor included in the second electronic devices from the second electronic devices.

Referring to FIG. 12A, a first electronic device 1200 may identify the locations of one or more second electronic devices 1220, 1230, and 1240 positioned on a display 1210 where one or more icons 1211, 1213, and 1215 are displayed. According to an embodiment of the present disclosure, the first electronic device 1200 may be wirelessly connected to the one or more second electronic devices 1220, 1230, and 1240.

An icon of the first electronic device may be dragged to a peripheral area of the determined location in operation 310.

Referring to FIG. 12B, one icon 1211 of the one or more icons 1211, 1213, and 1215 displayed on the display 1210 may be selected and be dragged to a peripheral area 1250 of the second electronic device 1230.

The electronic device may transmit a file associated with the icon to the second electronic device according to the drag in operation 320. For example, as illustrated in FIG. 12B, when a music icon 1211 is selected and is dragged to the peripheral area 1250 of the second electronic device 1230, the first electronic device 1200 may transmit a file associated with the music icon 1211 stored in the first electronic device 1200 to the second electronic device 1230. In another example, when a music icon 1211 of the first electronic device 1200 is dragged to a peripheral area 1260 or 1270 of another second electronic device 1220 or 1240, a file associated with the selected music icon 1211 may be transmitted to the another second electronic device 1220 or 1240. However, the present disclosure is not limited thereto, but various files associated with the various icons 1211, 1213, and 1215 stored in the first electronic device 1200 in the above-mentioned method may be transmitted to the one or more second electronic devices 1220, 1230, and 1240.

Figure 4:
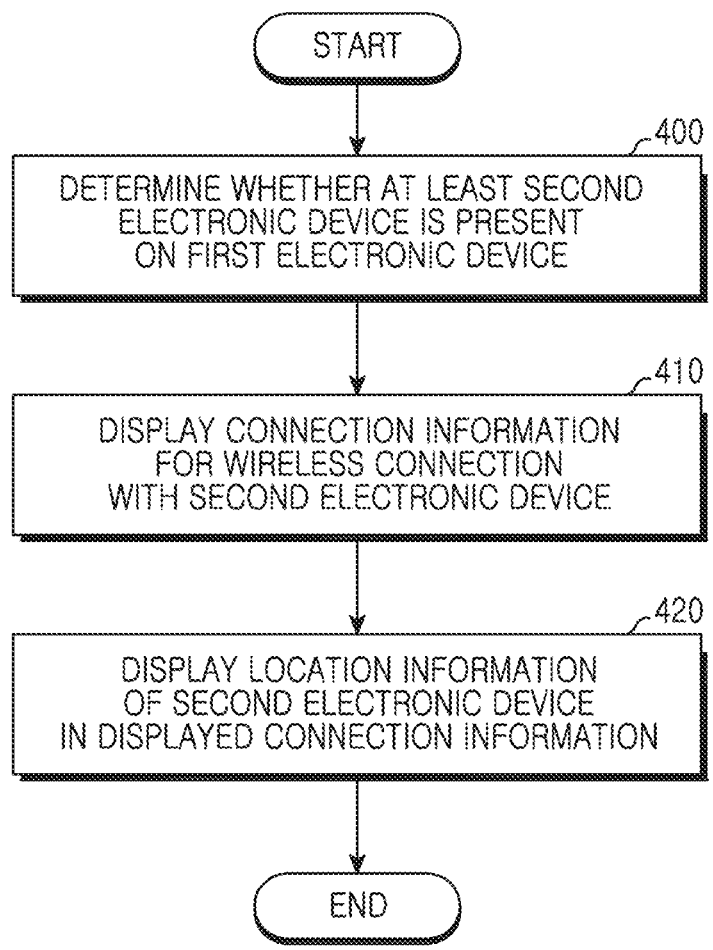
FIG. 4 illustrates a procedure for performing a function by a first electronic device while the first electronic device is interconnected with one or more second electronic devices according to an embodiment of the present disclosure.

FIG. 4 illustrates a procedure for performing a function by a first electronic device while the first electronic device is interconnected with one or more second electronic devices according to an embodiment of the present disclosure.

Referring to FIG. 4, the first electronic device may determine whether one or more second electronic devices are present on the first electronic device in operation 400. For example, the first electronic device may identify one or more second electronic devices positioned on the first electronic device, using one or more image sensors included an image sensor, a touchscreen, or a display functionally connected to the first electronic device.

Figure 13A:
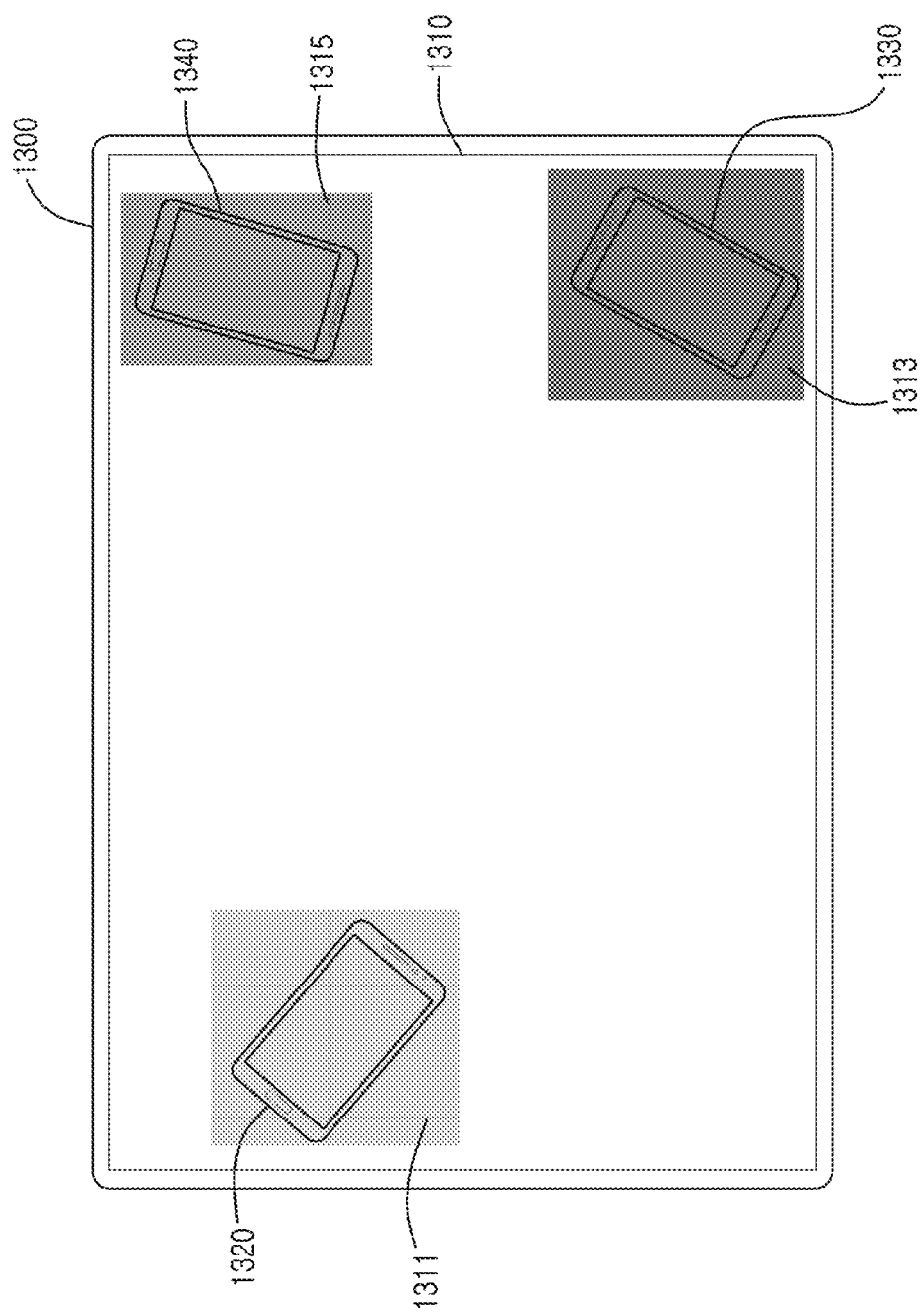
FIGS. 13A and 13B illustrate a method of performing a function by a first electronic device while the first electronic device is interconnected with one or more second electronic devices according to various embodiments of the present disclosure.
Figure 13B:
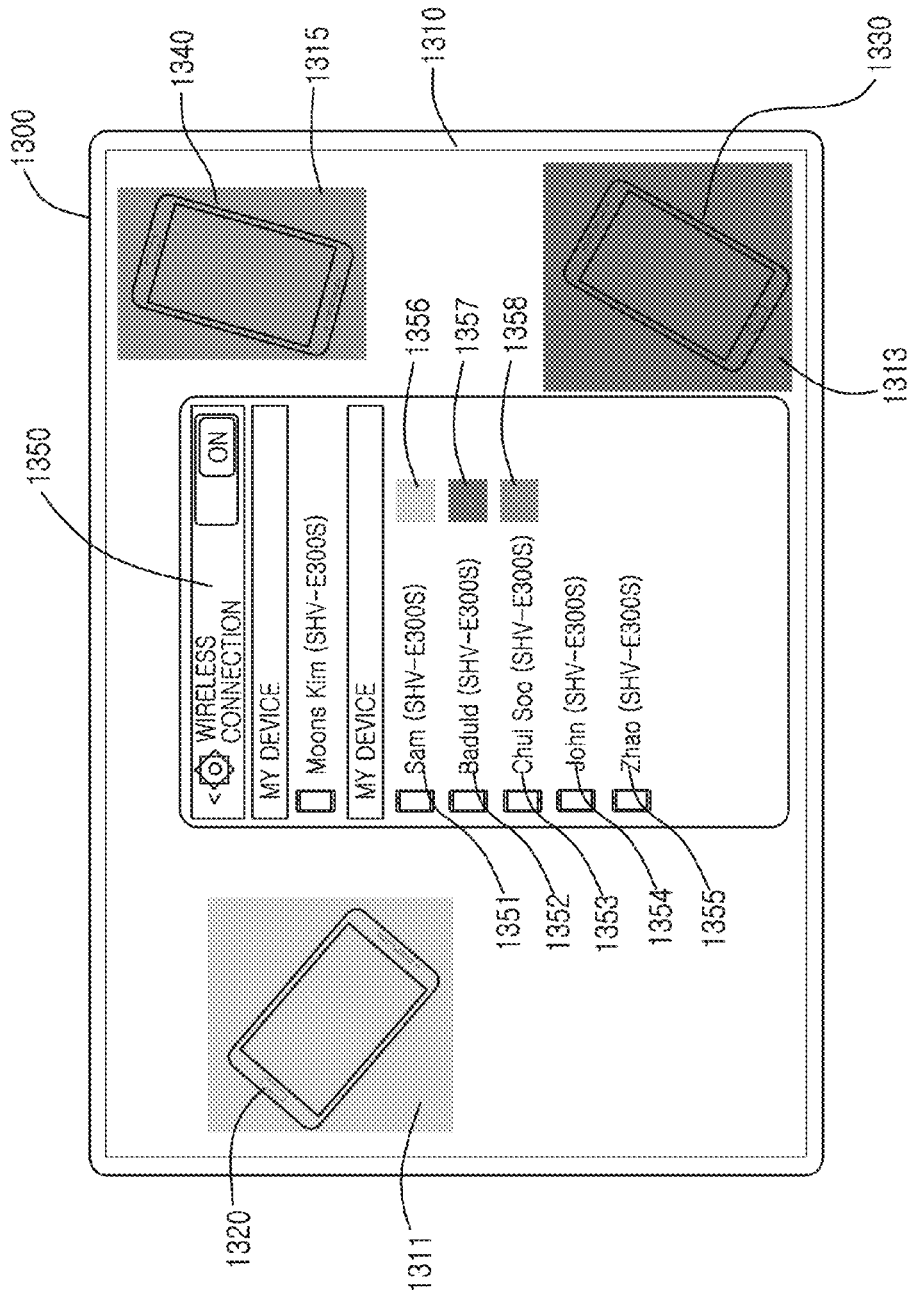

FIGS. 13A and 13B illustrate a method of performing a function by a first electronic device while the first electronic device is interconnected with one or more second electronic devices according to various embodiments of the present disclosure.

According to an embodiment of the present disclosure, the first electronic device may determine locations of the one or more second electronic devices on the first electronic device by displaying at least one pattern information element on the display and receiving pattern information elements input through the image sensor included in the second electronic devices from the second electronic devices.

Referring to FIG. 13A, a first electronic device 1300 may display one or more pattern information elements 1311, 1313, and 1315 at locations of second electronic devices 1320, 1330, and 1340 positioned on a display 1310 of the first electronic device 1300. The one or more pattern information elements 1311, 1313, and 1315 may include different brightness or colors associated with the coordinates on the display 1310 for determining locations of the second electronic devices 1320, 1330, and 1340.

According to an embodiment of the present disclosure, the second electronic devices 1320, 1330, and 1340 may receive the above-mentioned pattern information elements 1311, 1313, and 1315 through the image sensors provided in the second electronic devices 1320, 1330, and 1340.

The first electronic device may display connection information for wireless connection with the second electronic devices in operation 410. For example, the first electronic device may search for a device for wireless communication with another electronic device around the first electronic device. The wireless communication may include short-range wireless communication, and may include at least one of BT communication and Wi-Fi Direct communication.

Referring to FIG. 13B, the first electronic device 1300 may display a connection information element 1350 for wireless connection with the one or more second electronic devices 1320, 1330, and 1340 on the display 1310. The connection information element 1350 may include identification information elements 1351, 1352, 1353, 1354, and

1355 for the one or more second electronic devices 1320, 1330, and 1340 located within a certain distance from the first electronic device 1300.

The first electronic device may display the locations of the second electronic devices in the displayed connection information element in operation 420. For example, as illustrated in FIG. 13B, the first electronic device may display location information elements 1356, 1357, and 1358 associated with the corresponding pattern information elements 1311, 1313, and 1315 of the one or more second electronic devices 1320, 1330, and 1340 on the display, in the connection information element 1350 for wireless connection with the one or more second electronic devices 1320, 1330, and 1340. The location information elements 1356, 1357, and 1358 may include at least one of a letter, a number, a color, and a symbol associated with the pattern information elements 1311, 1313, and 1315. According to an embodiment of the present disclosure, the first electronic device 1300 may determine which second electronic device is located on the first electronic device 1300, through the location information elements 1356, 1357, and 1358 of the connection information element 1350.

According to various embodiments of the present disclosure, the first electronic device 1300 may identify the location information elements 1356, 1357, and 1358 displayed in the connection information element 1350, and perform wireless connection with the second electronic devices 1320, 1330, and 1340 corresponding to the location information elements 1356, 1357, and 1358.

Figure 5:
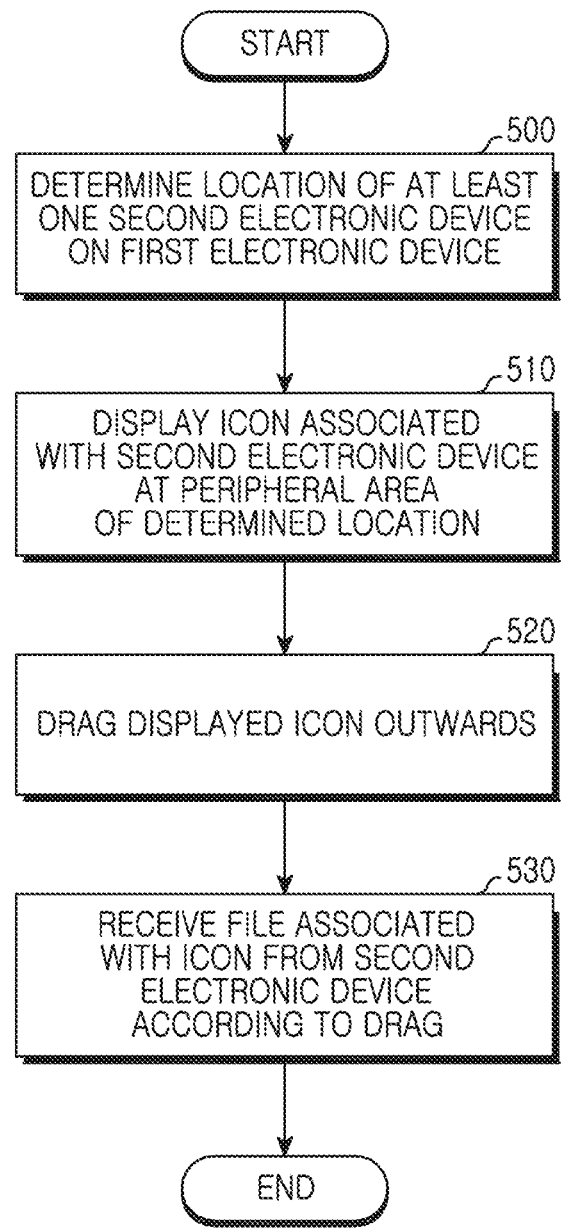
FIG. 5 illustrates a procedure for performing a function by a first electronic device while the first electronic device is interconnected with one or more second electronic devices according to an embodiment of the present disclosure.

FIG. 5 illustrates a procedure for performing a function by a first electronic device while the first electronic device is interconnected with one or more second electronic devices according to an embodiment of the present disclosure.

Referring to FIG. 5, the first electronic device may determine locations of one or more second electronic devices on the first electronic device in operation 500. For example, the first electronic device may determine whether one or more second electronic devices are positioned on the first electronic device, using one or more image sensors included an image sensor, a touchscreen, or a display functionally connected to the first electronic device.

According to an embodiment of the present disclosure, the first electronic device may determine locations of the one or more second electronic devices on the first electronic device by displaying at least one pattern information element on the display and receiving pattern information elements input through the image sensor included in the second electronic devices from the second electronic devices.

According to an embodiment of the present disclosure, the first electronic device may be wirelessly connected to one or more second electronic device.

An icon associated with the second electronic device may be displayed in a peripheral area of the determined location in operation 510. According to an embodiment of the present disclosure, the displayed icon may be an icon associated with a file stored in the second electronic device.

The first electronic device may drag the displayed icon outwards in operation 520.

The electronic device may receive a file associated with the icon to the second electronic device according to the drag in operation 530. For example, when a music icon is selected and dragged outwards, the second electronic device may transmit a file associated with the music icon stored in the second electronic device to the first electronic device. According to various embodiments of the present disclosure, various files associated with various icons stored in the second electronic device as well as the music icon may be transmitted to the first electronic device.

A method of operating a first electronic device according to various embodiments of the present disclosure includes determining whether at least one second electronic device is present on the first electronic device, displaying at least one image on a display of the first electronic device, identifying a first information element input to at least one image sensor of the second electronic device, comparing the identified first information element with a parameter of the displayed image, determining a location of the second electronic device according to the comparison result and displaying a second information element on the display according to the determined location.

According to various embodiments of the present disclosure, the determining of whether the second electronic device is present may include detecting the second electronic device through a sensor functionally connected to the first electronic device.

According to various embodiments of the present disclosure, the detecting of the second electronic device may include recognizing a change in an image before and after the second electronic device is located in the first electronic device and output information of the second electronic device.

According to various embodiments of the present disclosure, the output information of the second electronic device may include at least one of LED information, Infrared Emitting Diode (IRED) information, display information, and flash information.

According to various embodiments of the present disclosure, the image may include an image having colors or brightness based on coordinates of the display.

According to various embodiments of the present disclosure, the identifying of the first information element may include displaying color information or brightness information input to the image sensor together with connection information for BT or Wi-Fi Direct connection.

According to various embodiments of the present disclosure, the comparing of the identified first information element may include, when the first electronic device is connected to the second electronic element, comprising the parameter with terminal information of the second electronic device.

According to various embodiments of the present disclosure, the comparing of the identified first information element may include, when the first electronic device is not connected to the second electronic device, identifying wireless connection information of the second electronic device located within a certain distance from the first electronic device and comparing the parameter with terminal information of the second electronic device.

According to various embodiments of the present disclosure, the parameter may include at least one of color information and brightness information.

According to various embodiments of the present disclosure, the determining of the location may further include determining which part of the image displayed on the first electronic device the identified first information element corresponds to.

According to various embodiments of the present disclosure, the method may further include connecting the first electronic device and the second electronic device according to the comparison result.

According to various embodiments of the present disclosure, the displaying of the second information element may include displaying at least one of music, a video, a document, an image, an icon, and an application stored in the first electronic device.

According to various embodiments of the present disclosure, the method may further include, when the second information element is dragged to a peripheral area of the second electronic device, transmitting a file associated with the second information element to the second electronic device.

According to various embodiments of the present disclosure, the displaying of the second information element may include displaying at least one of music, a video, a document, an image, an icon, and an application stored in the second electronic device.

According to various embodiments of the present disclosure, when the second information element may be dragged to an area of a function window displayed on the first electronic device, executing a file associated with the second information element.

Figure 14:
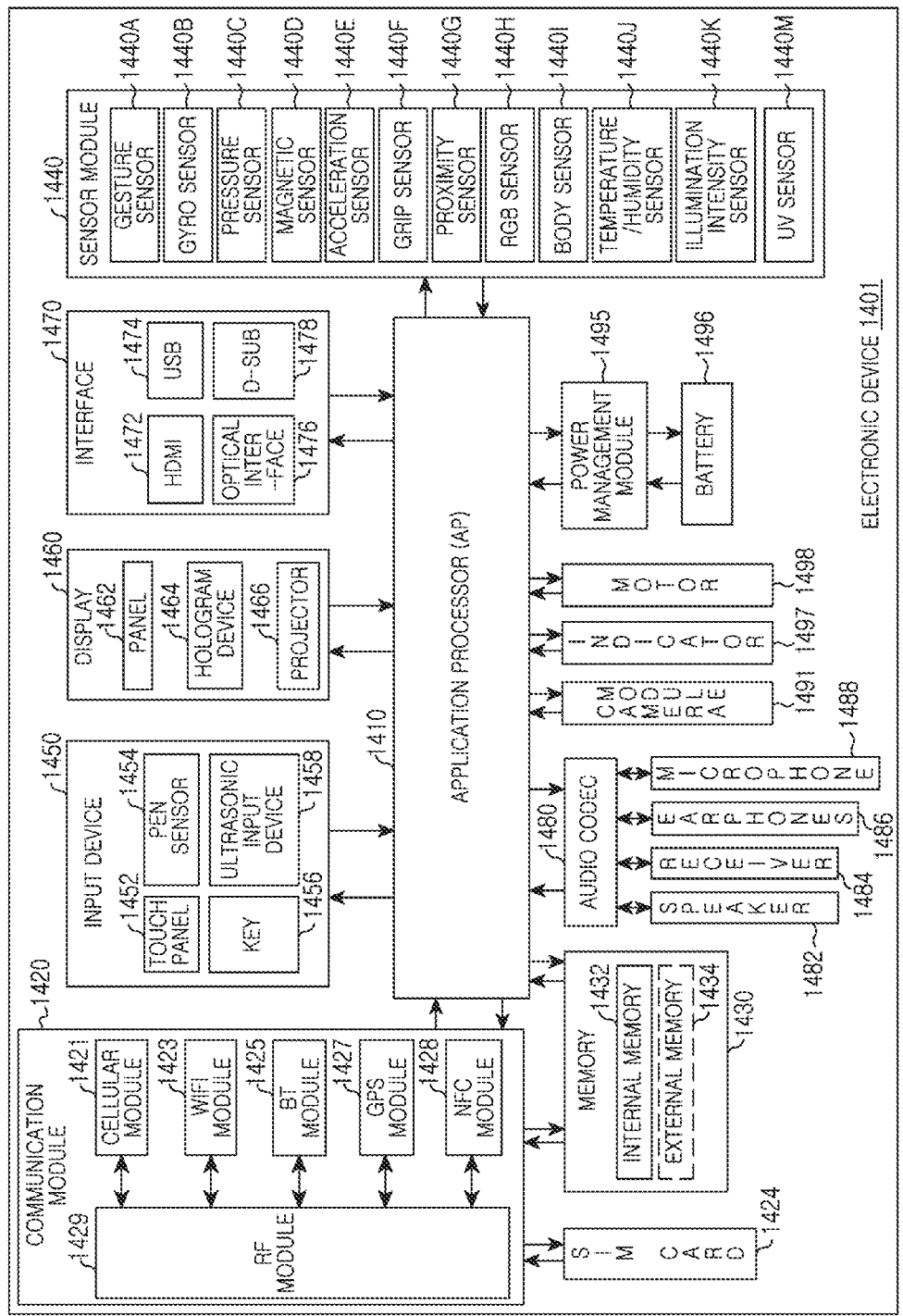
FIG. 14 is a block diagram illustrating an electronic device according to various embodiments of the present disclosure.

FIG. 14 is a block diagram of an electronic device according to various embodiments of the present disclosure. An electronic device 1401 may include, for example, an entire or some parts of the electronic device 100 illustrated in FIG. 1.

Referring to FIG. 14, the electronic device 1401 may include at least one application processor 1410, a communication module 1420, a SIM card 1424, a memory 1430, a sensor module 1440, an input unit 1450, a display unit 1460, an interface 1470, an audio module 1480, a camera module 1491, a power management module 1495, a battery 1496, an indicator 1497, and a motor 1498.

The AP 1410 may control one or more hardware or software elements connected to the AP 1410 by driving an operating system or an application program and perform processing of various pieces of data including multimedia data and calculations. The AP 1410 may be implemented by, for example, an SoC. According to an embodiment of the present disclosure, the AP 1410 may further include a GPU (not illustrated).

The communication module 1420 may perform data transmission/reception in communication between the electronic device 1401 (for example, the electronic device 100) and other electronic devices (for example, the electronic device 102 or the server 104) connected to electronic device 1401 through the network. According to an embodiment of the present disclosure, the communication module 1420 may include a cellular module 1421, a Wi-Fi module 1423, a BT module 1425, a GPS module 1427, an NFC module 1428, and a Radio Frequency (RF) module 1429.

The cellular module 1421 may provide a voice call, a video call, an SMS, or an Internet service through a communication network (for example, LTE, LTE-A, CDMA, WCDMA, UMTS, WiBro, or GSM). Furthermore, the cellular module 1421 may distinguish and authenticate electronic devices within a communication network, for example, using a SIM (for example, the SIM card 1424). According to an embodiment of the present disclosure, the cellular module 1421 may perform at least some functions which the AP 1410 may provide. For example, the cellular module 1421 may perform at least some of the multimedia control functions.

According to an embodiment of the present disclosure, the cellular module 1421 may include a CP. Furthermore, the cellular module 1421 may be implemented by, for example, an SoC. Although the elements, such as the cellular module 1421 (for example, a CP), the memory 1430, and the power management module 1495 are illustrated as elements separate from the AP 1410 in FIG. 14, the AP 1410 may include at least some of the aforementioned elements (for example, the cellular module 1421) according to one embodiment.

According to an embodiment of the present disclosure, the AP 1410 or the cellular module 1421 (for example, CP) may load a command or data received from at least one of a non-volatile memory and other elements connected thereto in a volatile memory, and may process the loaded command or data. Furthermore, the AP 1410 or the cellular module 1421 may store data received from or generated by at least one of other elements in a non-volatile memory.

Each of the Wi-Fi module 1423, the BT module 1425, the GPS module 1427, and the NFC module 1428 may include, for example, a processor for processing data transmitted/received through the corresponding module. Although the cellular module 1421, the Wi-Fi module 1423, the BT module 1425, the GPS module 1427, and the NFC module 1428 are illustrated as separate blocks in FIG. 14, at least some (for example, two or more) of the cellular module 1421, the Wi-Fi module 1423, the BT module 1425, the GPS module 1427, and the NFC module 1428 may be included in one IC or one IC package in an embodiment of the present disclosure. For example, at least some (for example, the communication processor corresponding to the cellular module 1421 and the Wi-Fi processor corresponding to the Wi-Fi module 1423) of the processors corresponding to the cellular module 1421, the Wi-Fi module 1423, the BT module 1425, the GPS module 1427, and the NFC module 1428 may be implemented as one SoC.

The RF module 1429 may transmit and receive data, for example, an RF signal. Although not illustrated, the RF module 1429 may include, for example, a transceiver, a Power Amp Module (PAM), a frequency filter, a Low Noise Amplifier (LNA), or the like. Further, the RF module 1429 may further include an element for transmitting/receiving electronic waves over a free air space in wireless communication, for example, a conductor, a conducting wire or the like. Although the cellular module 1421, the Wi-Fi module 1423, the BT module 1425, the GPS module 1427, and the NFC module 1428 share one RF module 1429 in FIG. 14, at least one of the cellular module 1429, the Wi-Fi module 1421, the BT module 1423, the GPS module 1425, and the NFC module 1428 may transmit/receive an RF signal through a separate RF module in one embodiment.

The SIM card 1424 may be a card including a SIM, and may be inserted into a slot formed in a particular portion of the electronic device. The SIM card 1424 may include unique identification information (for example, an Integrated Circuit Card IDentifier (ICCID)) or subscriber information (for example, an International Mobile Subscriber IDentity (IMSI)).

The memory 1430 (for example, the memory 130) may include an internal memory 1432 or an external memory 1434. The internal memory 1432 may include at least one of a volatile memory (for example, a DRAM, an SRAM, an SDRAM, and the like) and a non-volatile memory (for example, an OTPROM, a PROM, an EPROM, an EEPROM, a mask ROM, a flash ROM, a NAND flash memory, a NOR flash memory, and the like).

According to an embodiment of the present disclosure, the internal memory 1432 may be an SSD. The external memory 1434 may further include a flash drive, for example, a CF, an SD, a Micro-SD, a Mini-SD, an xD, a memory stick, or the like. The external memory 1434 may be functionally connected with the electronic device 1401 through various interfaces. According to an embodiment of the present disclosure, the electronic device 1401 may further include a storage device (or a storage medium), such as a hard disc drive.

The sensor module 1440 may measure a physical quantity or detect an operation state of the electronic device 1401, and may convert the measured or detected information to an electrical signal. The sensor module 1440 may include, for example, at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (for example, RGB sensor), a biometric sensor 1440I, a temperature/humidity sensor 1440J, an illumination sensor 1440K, and a UV sensor 1440M. Additionally or alternatively, the sensor module 1440 may include, for example, an E-nose sensor (not illustrated), an EMG sensor (not illustrated), an EEG sensor (not illustrated), an ECG sensor (not illustrated), an IR sensor, an iris sensor (not illustrated), a fingerprint sensor, and the like. The sensor module 1440 may further include a control circuit for controlling one or more sensors included in the sensor module 1440.

The input device 1450 may include a touch panel 1452, a (digital) pen sensor 1454, a key 1456, or an ultrasonic input device 1458. The touch panel 1452 may recognize a touch input through at least one of, for example, a capacitive type, a resistive type, an infrared type, and an ultrasonic type. The touch panel 1452 may further include a control circuit. In the case of the capacitive type touch panel, physical contact or proximity recognition is possible. The touch panel 1452 may further include a tactile layer. In this case, the touch panel 1452 may provide a tactile reaction to the user.

The (digital) pen sensor 1454 may be implemented, for example, using the same or similar method to receiving a user's touch input or using a separate recognition sheet. The key 1456 may include, for example, a physical button, an optical key, or a keypad. The ultrasonic input device 1458 may identify data by detecting an acoustic wave with a microphone (for example, microphone 1488) of the electronic device 1401 through an input unit generating an ultrasonic signal, and may perform wireless recognition. According to an embodiment of the present disclosure, the electronic device 1401 may receive a user input from an external device (for example, computer or server) connected thereto using the communication module 1420.

The display 1460 may include a panel 1462, a hologram device 1464 or a projector 1466. The panel 1462 may be, for example, a Liquid Crystal Display (LCD) or an Active Matrix Organic LED (AM-OLED). The panel 1462 may be implemented to be, for example, flexible, transparent, or wearable. The panel 1462 may be configured as one module together with the touch panel 1452. The hologram device 1464 may show a stereoscopic image in the air using interference of light. The projector 1466 may project light onto a screen to display an image. The screen may be located, for example, inside or outside the electronic device 1401. According to an embodiment of the present disclosure, the display 1460 may further include a control circuit for controlling the panel 1462, the hologram device 1464, or the projector 1466.

The interface 1470 may include, for example, an HDMI 1472, a USB 1474, an optical interface 1476, or a D-subminiature (D-sub) 1478. The interface 1470 may be included in, for example, the communication unit 160 illustrated in FIG. 1. Additionally or alternatively, the interface 1470 may include, for example, a Mobile High-definition Link (MHL) interface, an SD card/Multi-Media Card (MMC) interface, or an Infrared Data Association (IrDA) standard interface.

The audio module 1480 may bilaterally convert a sound and an electronic signal. The audio module 1480 may process sound information input or output through, for example, a speaker 1482, a receiver 1484, earphones 1486, a microphone 1488, or the like.

The camera module 1491 is a device for capturing a still image or a video, and according to an embodiment of the present disclosure, may include one or more image sensors (for example, a front sensor or a rear sensor), a lens (not illustrated), an Image Signal Processor (ISP) (not illustrated), or a flash (not illustrated) (for example, an LED or xenon lamp).

The power management module 1495 may manage power of the electronic device 1401. Although not illustrated, the power management module 1495 may include, for example, a Power Management IC (PMIC), a charger IC, or a battery or fuel gauge. The PMIC may be mounted to, for example, an integrated circuit or an SoC semiconductor.

Charging methods may be classified into a wired charging method and a wireless charging method. The charger IC may charge a battery and prevent over voltage or over current from a charger. According to an embodiment of the present disclosure, the charger IC may include a charger IC for at least one of the wired charging method and the wireless charging method. Examples of the wireless charging method may include a magnetic resonance type, a magnetic induction type, or an electromagnetic wave type, and an additional circuit for wireless charging, such as a coil loop circuit, a resonance circuit, a rectifier circuit, and the like, may be added.

The battery gauge may measure, for example, a remaining quantity of the battery 1496, or a voltage, a current, or a temperature during the charging. The battery 1496 may store or generate electricity, and may supply power to the electronic device 1401 using the stored or generated electricity. The battery 1496 may include, for example, a rechargeable battery or a solar battery.

The indicator 1497 may display a specific status of the electronic device 1401 or the part (for example the AP 1410) of electronic device 1401, for example, a booting status, a message status, a charging status, and the like. The motor 1498 may convert an electrical signal to a mechanical vibration. Although not illustrated, the electronic device 1401 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeably used with a term, such as a unit, a logic, a logical block, a component, a circuit, and the like. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific IC (ASIC) chip, a Field-Programmable Gate Arrays (FPGAs), and a programmable-logic device for performing operations which have been known or are to be developed hereafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130. At least a part of the programming module may be implemented (for example, executed) by, for example, the processor 120. At least some of the programming modules may include, for example, a module, a program, a routine, a set of instructions or a process for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium for storing commands is set to allow at least one processor to perform at least one operation when the commands are executed by the at least one processor, and the at least one operation may include operations of determining whether at least one second electronic device is present on a first electronic device, by the first electronic device, displaying at least one image on a display of the first electronic device, identifying a first information element input to at least one image sensor of the second electronic device, comparing the identified first information element with a parameter of the displayed image, determining a location of the second electronic device according to the comparison result and displaying a second information element on the display according to the determined location.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a first electronic device, the method comprising:
   determining whether at least one second electronic device is present on the first electronic device;
   displaying at least one image on a display of the first electronic device;
   identifying a first information input to at least one image sensor of the at least one second electronic device;
   comparing the identified first information with a parameter of the displayed at least one image;
   determining a location of the at least one second electronic device based on the comparison result; and
   displaying a second information on the display based on the determined location.

2. The method of claim 1, wherein the determining of whether the at least one second electronic device is present on the first electronic device comprises detecting the at least one second electronic device through a sensor functionally connected to the first electronic device.

3. The method of claim 2, wherein the detecting of the at least one second electronic device though the sensor comprises recognizing at least one of a change in an image before and after the at least one second electronic device is located in the first electronic device and output information of the at least one second electronic device.

4. The method of claim 3, wherein the output information of the at least one second electronic device comprises at least one of Light Emitting Diode (LED) information, Infrared Emitting Diode (IRED) information, display information, or flash information.

5. The method of claim 1, wherein the at least one image comprises an image having colors or brightness based on coordinates of the display.

6. The method of claim 1, wherein the identifying of the first information comprises displaying color information or brightness information input to the at least one image sensor together with connection information for Bluetooth or Wi-Fi Direct connection.

7. The method of claim 1, wherein the comparing of the identified first information with the parameter of the displayed at least one image comprises, when the first electronic device is connected to the at least one second electronic element, comparing the parameter with terminal information of the at least one second electronic device.

8. The method of claim 1, wherein the comparing of the identified first information with the parameter of the displayed at least one image comprises, when the first electronic device is not connected to the at least one second electronic device, identifying wireless connection information of the at least one second electronic device located within a certain distance from the first electronic device and comparing the parameter with terminal information of the at least one second electronic device.

9. The method of claim 1, wherein the parameter comprises at least one of color information and brightness information.

10. The method of claim 1, wherein the determining of the location of the at least one second electronic device comprises determining which part of the at least one image displayed on the first electronic device the identified first information corresponds to.

11. The method of claim 1, further comprising connecting the first electronic device and the at least one second electronic device based on the comparison result.

12. The method of claim 1, wherein the displaying of the second information comprises displaying at least one of music, a video, a document, an image, an icon, or an application stored in the first electronic device.

13. The method of claim 12, further comprising, when the second information is dragged to a peripheral area of the at least one second electronic device, transmitting a file associated with the second information to the at least one second electronic device.

14. The method of claim 1, wherein the displaying of the second information comprises displaying at least one of music, a video, a document, an image, an icon, or an application stored in the at least one second electronic device.

15. The method of claim 14, wherein, when the second information is dragged to an area of a function window displayed on the first electronic device, executing a file associated with the second information.

16. At least one non-transitory computer readable storage medium for storing a computer program of instructions configured to be readable by at least one processor for instructing the at least one processor to execute a computer process for performing the method of claim 1.

17. A first electronic device comprising:
a display;
a sensor functionally connected to the display; and
a processor configured:
to determine whether at least one second electronic device is present on the first electronic device through the sensor,
to display at least one image on the display,
to identify a first information input to at least one image sensor of the at least one second electronic device,
to compare the identified first information with a parameter of the displayed at least one image,
to determine a location of the at least one second electronic device based on the comparison result, and
to display the at least one second information on the display based on the determined location.

18. The first electronic device of claim 17, wherein the sensor of the first electronic device comprises an image sensor configured to recognize at least one of a change in an image before and after the at least one second electronic device is located in the first electronic device and output information of the at least one second electronic device.

19. The first electronic device of claim 17, wherein the processor is further configured to display color information or brightness information input to the at least one image sensor together with connection information for Bluetooth or Wi-Fi Direct connection.

20. The first electronic device of claim 17, wherein the processor is further configured:
to determine which part of the at least one image displayed on the first electronic device the identified first information corresponds to, and
to determine a location of the at least one second electronic device.

* * * * *